(12) United States Patent
Murray et al.

(10) Patent No.: US 12,535,039 B2
(45) Date of Patent: Jan. 27, 2026

(54) METHODS AND APPARATUS TO REGULATE A GASEOUS FUEL SYSTEM

(71) Applicant: General Electric Company, Schenectady, NY (US)

(72) Inventors: Michael Joseph Murray, Wyoming, OH (US); Arthur W. Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/410,663

(22) Filed: Jan. 11, 2024

(65) Prior Publication Data
US 2025/0230774 A1 Jul. 17, 2025

(51) Int. Cl.
*F02C 7/232* (2006.01)
*F23K 5/18* (2006.01)

(52) U.S. Cl.
CPC ............... *F02C 7/232* (2013.01); *F23K 5/18* (2013.01); *F23D 2209/30* (2013.01)

(58) Field of Classification Search
CPC ..... F23R 2900/00004; F23K 2300/203; F23K 5/16; F23K 5/18; F02C 7/22; F02C 7/232
See application file for complete search history.

(56) References Cited

U.S. PATENT DOCUMENTS

| | | | |
|---|---|---|---|
| 6,050,081 A * | 4/2000 | Jansen | F16K 11/07 137/112 |
| 6,604,558 B2 | 8/2003 | Sauer | |
| 6,996,969 B2 | 2/2006 | Dalton | |
| 8,127,524 B2 | 3/2012 | Falke et al. | |
| 9,701,416 B2 | 7/2017 | Epstein et al. | |
| 10,247,110 B2 | 4/2019 | Scipio et al. | |
| 10,989,117 B2 | 4/2021 | Roberge | |
| 11,421,599 B2 | 8/2022 | Horikawa et al. | |
| 11,674,443 B2 | 6/2023 | Gibson et al. | |
| 11,760,502 B2 | 9/2023 | Palmer | |
| 2013/0091824 A1 * | 4/2013 | Murakami | F02C 7/232 60/39.463 |
| 2013/0186057 A1 | 7/2013 | Shanmugam et al. | |
| 2017/0254270 A1 | 9/2017 | Okada et al. | |
| 2023/0243311 A1 | 8/2023 | Brady et al. | |
| 2023/0265797 A1 | 8/2023 | Brady et al. | |
| 2024/0068404 A1 * | 2/2024 | Williams | F02M 51/0617 |

* cited by examiner

*Primary Examiner* — Gerald L Sung

(74) *Attorney, Agent, or Firm* — Hanley, Flight & Zimmerman, LLC

(57) ABSTRACT

Systems, apparatus, and methods to a flame out valve for a gaseous fuel system are disclosed. An example apparatus to reduce fuel combustion comprises: a first valve connected to a fuel supply line, the first valve including: a first plug to control a flow of fuel; a first spring coupled to a first end of the first plug; and a first magnet coupled to a second end of the first plug; a second valve connected to a purge system in parallel with the fuel supply line, the second valve including: a second plug to control a flow of a gas; a second spring coupled to a first end of the second plug; and a second magnet coupled to a second end of the second plug, the second magnet magnetically coupled to the first magnet; and an electromagnetic actuator coupled to at least one of the first or the second valve.

14 Claims, 16 Drawing Sheets

(PRIOR)

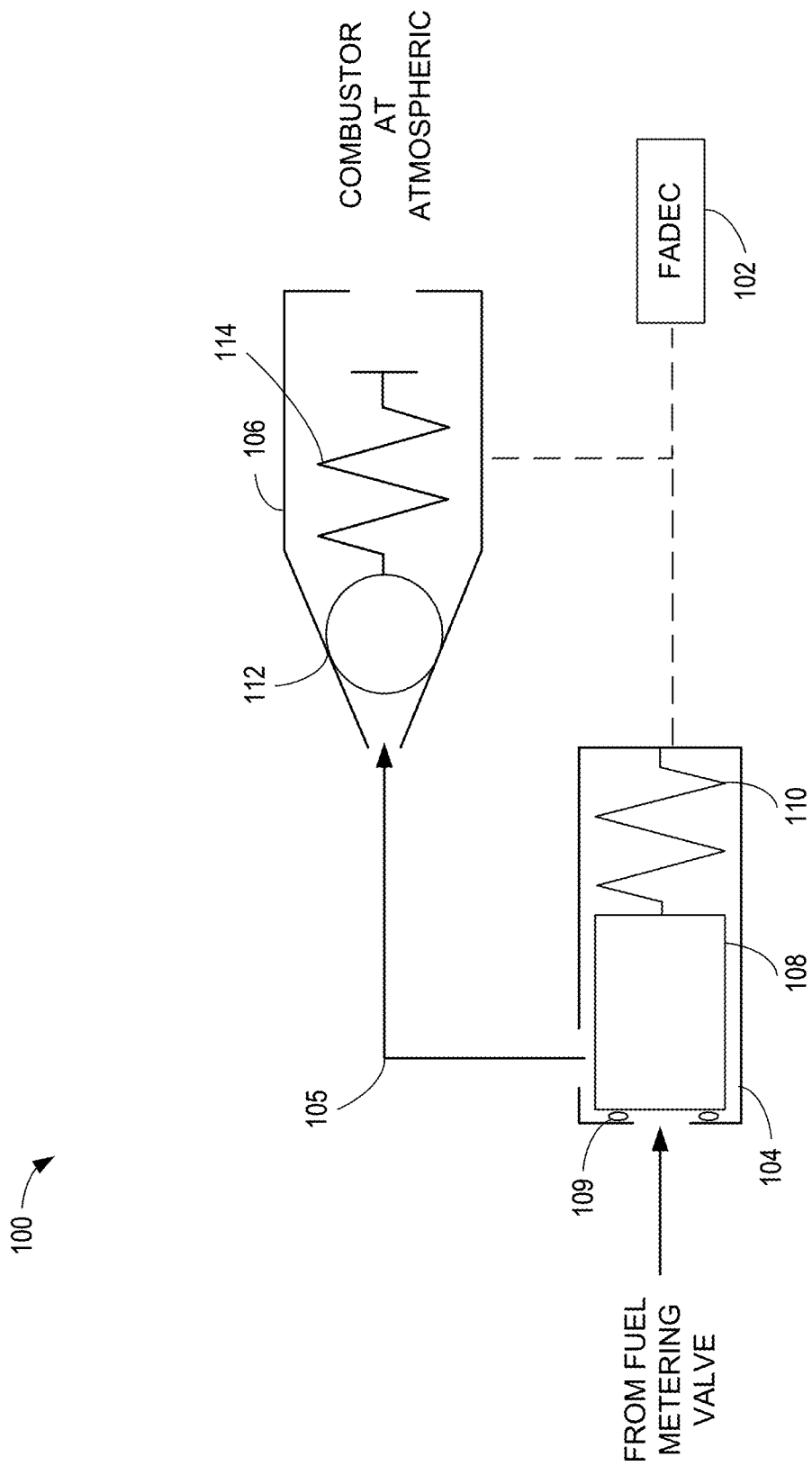
FIG. 1B (PRIOR)

METHODS AND APPARATUS TO REGULATE A GASEOUS FUEL SYSTEM

FIELD OF THE DISCLOSURE

This disclosure relates generally to aircraft fuel systems and, more particularly, to methods and apparatus to regulate a gaseous fuel system.

BACKGROUND

Turbine engines, and particularly gas or combustion turbine engines, are rotary engines that extract energy from a flow of combusted gases passing through the engine onto a multitude of rotating turbine blades.

A turbine engine includes but is not limited to, in serial flow arrangement, a fan assembly, a high-pressure compressor for compressing air flowing through the engine, a combustor for mixing fuel with the compressed air such that the mixture may be ignited, and a high-pressure turbine. The high-pressure compressor, combustor and high-pressure turbine are sometimes collectively referred to as the core engine.

Traditionally, turbine engines include a fuel supply system to transfer fuel from a fuel tank to the combustor.

BRIEF DESCRIPTION OF THE DRAWINGS

FIG. 1B is a block diagram of an existing fuel system configuration from a fuel metering valve to a combustor in which a valve and nozzle are closed.

Figure 1A:
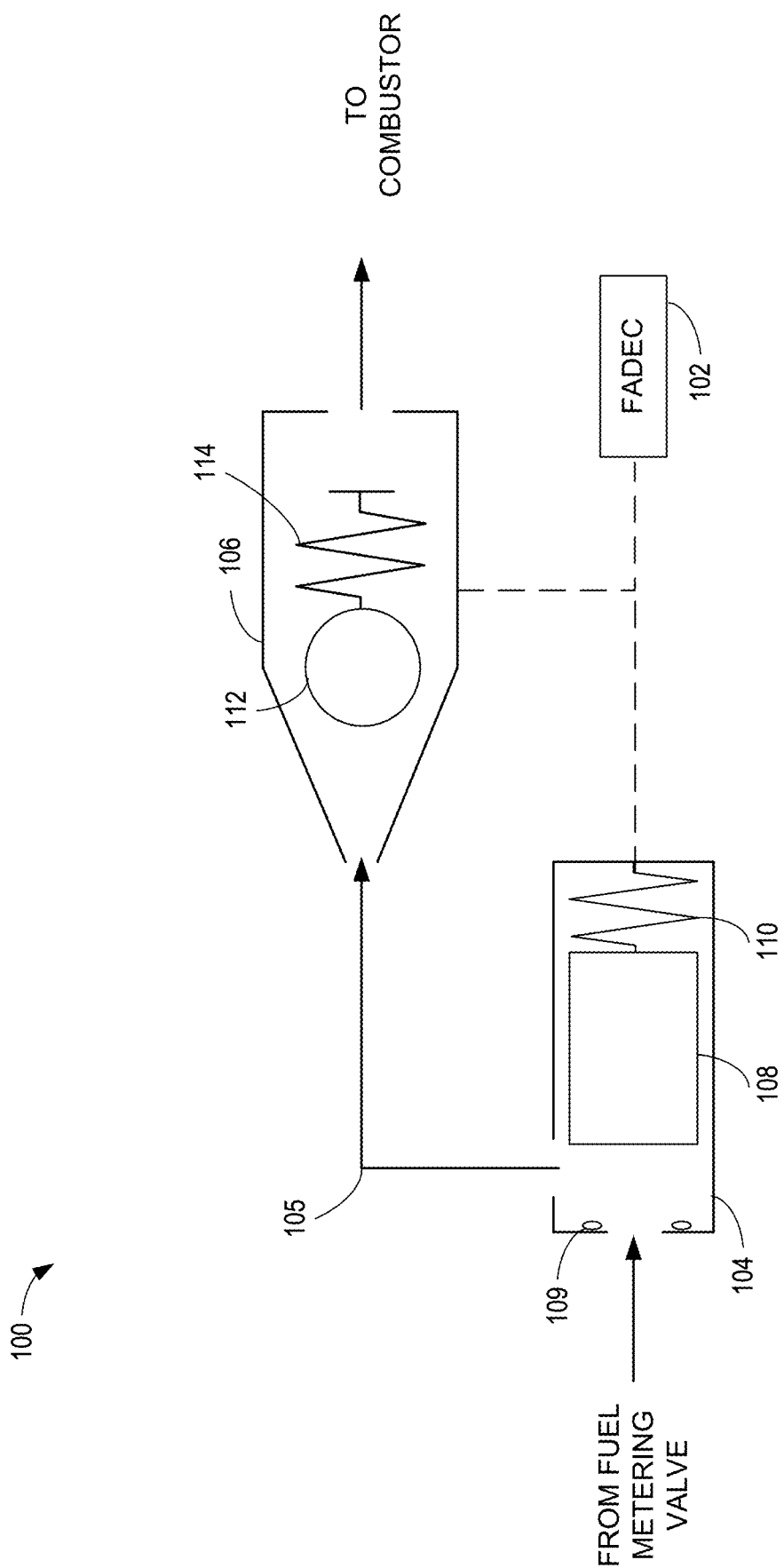
FIG. 1A is a block diagram of an existing fuel system configuration from a fuel metering valve to a combustor in which a valve and nozzle are open.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Fuel supply systems, also referred to as fuel metering systems, are used in combustion turbine engines to supply combustible fuel from a fuel supply to a combustor. In a combustor, supplied combustible fuel is combined with high pressure air and burned. The resulting high temperature exhaust gases enable heating, which is used to turn a turbine and produce thrust.

The desired state of the combustion turbine engine determines the configuration of components such as valves in the fuel supply line. The faster a combustion turbine engine is desired to run (referred to herein as run state), the greater the rate of fuel needs to be supplied. When the combustion turbine engine is desired to be shut off (referred to herein as shutoff state), fuel supply is cut off to the combustor to limit further heating and thrust production. The shutoff of fuel supply leaves combustible fuel in the supply line. The combustible fuel in the supply line presents the risk of flashback, or the ignition of the fuel in the supply line.

An overspeed state can result when a rotating component exceeds its maximum designed operating rotational speed. Rotating components typically include compressors, turbines, and/or shafts. Overspeed states can lead to the mechanical failure of elements of the combustion turbine engine. Fuel supply lines, if purged, can result in exceeding a lower threshold associated with overspeed states by allowing the fuel trapped in the fuel supply line to flow out a fuel nozzle and into the combustor.

In order to monitor the engine conditions and control the components of the combustion turbine engine, a system is used to receive multiple input variables of the current flight or ground conditions and compute the operating parameters for the aircraft engine. These operating parameters are converted to signals applied to adjust the various engine components to achieve the calculated fuel flow, stator vane position, bleed valve position, etc. An example of such a system is a full authority digital engine controller (FADEC). A FADEC includes an electronic engine controller (EEC), engine control unit (ECU) and related accessories that control aspects of engine performance, such as a throttle lever, valves, sensors, etc. The FADEC operates by receiving the input variables indicative of current parameters (e.g., and desired settings (e.g., a throttle lever position). The inputs are received by the EEC and analyzed by the ECU. The FADEC then applies changes to the related accessories that control aspects of engine performance to achieve the desired state.

The FADEC is coupled to components of the fuel supply line to achieve the desired operating state associated with the engine. For example, the FADEC monitors the position of a throttle lever and the current thrust of the engine. The throttle lever is indicative of the desired thrust. The EEC of the FADEC determines the position of the throttle lever and the thrust level, communicating the values to the ECU of the FADEC. The ECU analyzes the inputs and then sends signals to accessories such as valves to control the supply of fuel to the combustor of the engine to achieve the desired thrust level.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this disclosure, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute a first set of instructions to perform one or more operations and/or functions, Field Programmable Gate Arrays (FPGAs) that may be programmed with a second set of instructions to cause configuration and/or structuring of the FPGAs to instantiate one or more operations and/or functions corresponding to the first instructions, Graphics Processor Units (GPUs) that may execute a first set of instructions to perform one or more operations and/or functions, Digital Signal Processors (DSPs) that may execute a first set of instructions to perform one or more operations and/or functions, XPUs, Network Processing Units (NPUs) one or more microcontrollers that may execute a first set of instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

Turning now to the figures, FIG. 1A is a block diagram of an example fuel supply system 100 in which an example existing sealing shutoff valve 104 and sealing fuel nozzle 106 operate to provide fuel flow to a combustor (not shown in this view). The existing sealing shutoff valve 104 and existing sealing fuel nozzle 106 are connected in serial flow configuration by a fuel supply line 105 with the sealing shutoff valve 104 upstream of the sealing fuel nozzle 106, which is upstream of the combustor. The existing sealing shutoff valve 104 and sealing fuel nozzle 106 are controlled by a full authority digital engine controller (FADEC) 102. The existing sealing shutoff valve 104 includes a first plug 108, an elastomeric seal 109 and a first spring 110. The sealing fuel nozzle 106 includes a second plug 112 and a second spring 114.

In the example of FIG. 1A, the FADEC 102 determines the engine state and actuates engine fuel system features that adjust system pressures which causes the first and second springs 110, 114 to close or open the existing sealing shutoff valve 104 and sealing fuel nozzle 106, depending on the determination of the engine state. The existing sealing shutoff valve 104 and sealing fuel nozzle 106 are in an open configuration when the first plug 108 and the second plug 112 are actuated away from the opening in the existing sealing shutoff valve 104 and sealing fuel nozzle 106, respectively, by commands from the FADEC 102. The open configuration is shown in FIG. 1A. As an alternative, the existing sealing shutoff valve 104 and the existing sealing fuel nozzle 106 are in a closed configuration when the first plug 108 and second plug 112 are actuated towards the openings in the existing sealing shutoff valve 104 and existing sealing fuel nozzle 106, respectively, by commands from the FADEC 102. When the first spring 110 actuates the first plug 108 towards the opening in the existing sealing shutoff valve 104, the first plug 108 interfaces with the elastomeric seal 109 to improve the sealing of the first plug 108 to a wall of the existing sealing shutoff valve 104. The closed configuration is shown in FIG. 1B.

In operation, the existing sealing shutoff valve 104 and existing sealing fuel nozzle 106 are used in the fuel supply system, supplying fuel to the combustor from a fuel metering valve when the FADEC 102 determines that the engine is at a run state. In the open configuration, the existing sealing shutoff valve 104 and existing sealing fuel nozzle 106 allow fuel to flow from the fuel metering valve, through the existing sealing shutoff valve 104, then through the fuel supply line 105, and through the existing sealing fuel nozzle 106 to the combustor. The closed configuration operation is discussed below in conjunction with FIG. 1B.

FIG. 1B shows the FADEC 102, the existing sealing shutoff valve 104 and the existing sealing fuel nozzle 106 of FIG. 1A in a closed configuration. The existing sealing shutoff valve 104 includes the first plug 108, the elastomeric seal 109, and the first spring 110. The sealing fuel nozzle 106 includes the second plug 112 and the second spring 114. The existing sealing shutoff valve 104 and the existing sealing fuel nozzle 106 actuate in response to commands the FADEC 102 gives to fuel system elements, as described in this disclosure. The existing sealing shutoff valve 104 and the existing sealing fuel nozzle 106 are coupled in serial flow order by the fuel supply line 105.

In the example closed configuration of FIG. 1B, the FADEC 102 acts upon fuel system elements causing the first and second springs to expand. In this example, the first plug 108 and second plug 112 are actuated towards openings in the existing sealing shutoff valve 104 and existing sealing fuel nozzle 106, respectively, to block fuel flow. The first plug 108 is actuated to create a seal with the elastomeric seal 109, which is around the opening of the existing sealing shutoff valve 104. The seal created by the first plug 108 interacting with the elastomeric seal 109 blocks fuel flow. Additionally, the second plug 112 is actuated by the second spring 114 towards the opening of the existing sealing fuel nozzle 106 to block any fuel that is in the fuel supply line 105 or any fuel that leaks from the fuel metering valve through the existing sealing shutoff valve 104.

In operation of the example fuel supply system 100 in the closed configuration of FIG. 1B, the FADEC 102 determines that the engine state is shutoff, requiring fuel to stop flowing to the combustor. Accordingly, the FADEC 102 acts upon fuel system elements causing the first spring 110 and the second spring 114 to expand and cause the first plug 108 and second plug 112 to actuate towards the opening in the existing sealing shutoff valve 104 and the existing sealing fuel nozzle 106, respectively. The actuation towards the openings in the existing sealing shutoff valve 104 and the existing sealing fuel nozzle 106 causes control over a flow of fuel to the combustor by the first plug 108 interacting with the elastomeric seal 109 to obstruct fuel flow and the second plug 112 obstructing fuel flow due to a conical shape of the existing sealing fuel nozzle 106. Once the FADEC 102 signals the actuation of the first spring 110 and second spring 114 to actuate the first plug 108 and second plug 112 to obstruct flow of the fuel, the fuel supply is no longer sufficient to enable the combustor to continually run. However, if the elastomeric seal 109 fails to be leakproof, fuel can leak into the system and cause some fuel to flow to the combustor. Additionally, the fuel trapped in the fuel supply line 105 creates a risk for flashback from the combustor.

FIGS. 1A and 1B show an example arrangement. The example arrangement of FIGS. 1A and 1B is not limiting but rather is an example to show that fuel systems leave a residual volume of flammable fuel in the engine following shutdown.

Figure 2A:
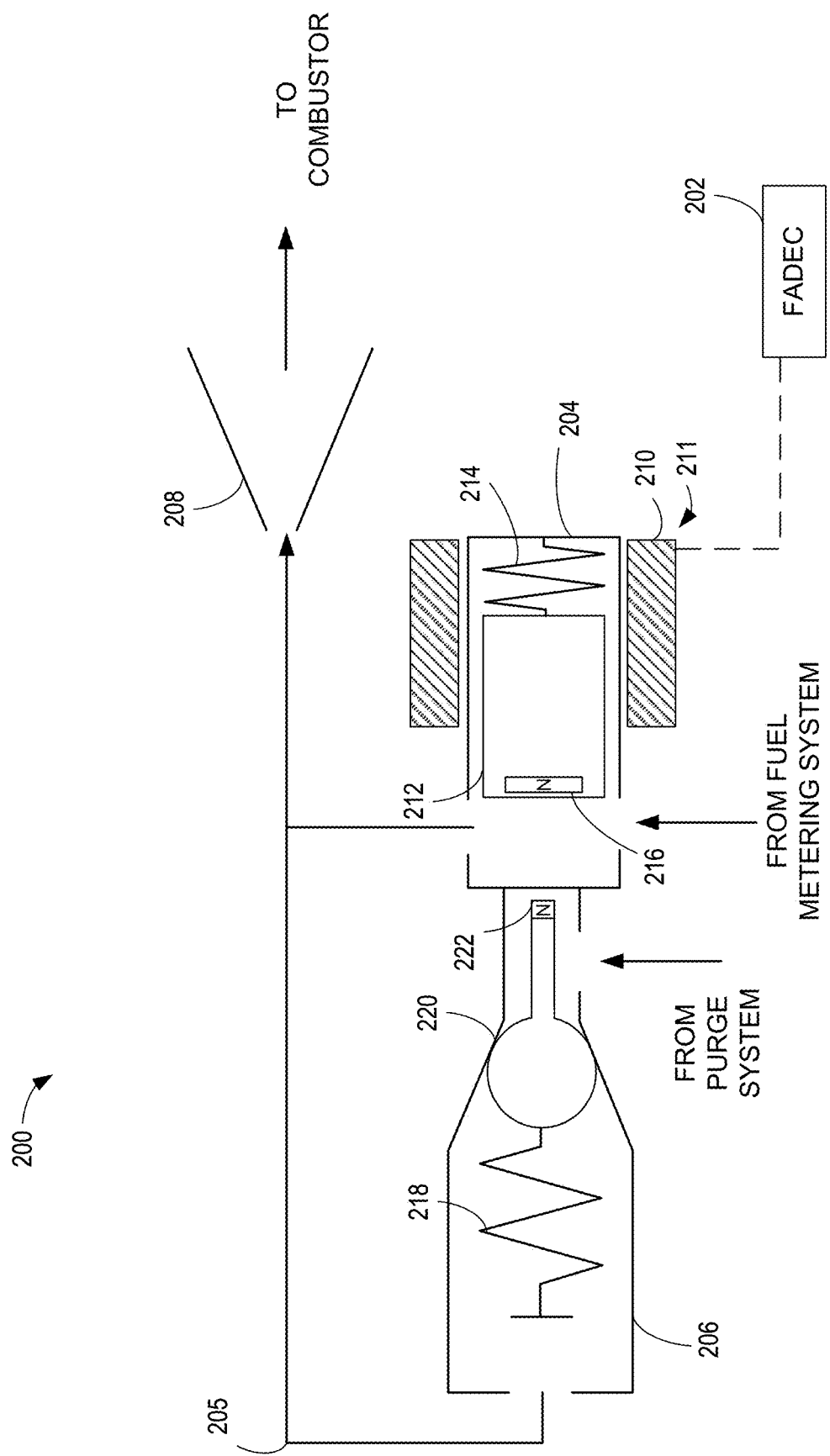
FIG. 2A is a is a block diagram of a fuel system in accordance with the teachings of this disclosure in an open configuration.

FIG. 2A is a block diagram of a flame out valve system 200 in accordance with the teachings of this disclosure in an open configuration. The flame out valve system 200 includes a FADEC 202, a flame out vent valve 204, a purge valve 206, a fuel supply line 205, and a non-sealing fuel nozzle 208. The flame out vent valve 204 includes a first plug 212 coupled to a first actuator 211 which in this example includes a first spring 214 at a first end of the first plug 212 and a first set of electrical coils 210. The first plug 212 has a first magnet 216 with a polarity (e.g., N) at a second end of the first plug 212. The purge valve 206 includes a second plug 220 coupled to a second actuator 218 at a first end of the second plug 220. The second plug 220 has a second magnet 222 with a polarity that is the same polarity as the first magnet 216 located at a second end of the second plug 220.

In the configuration of FIG. 2A, the flame out vent valve 204 is in parallel flow with the purge valve 206, meaning that the purge valve 206 is downstream of a purge system, and the flame out vent valve 204 is downstream of a fuel metering system. The flame out vent valve 204 is connected to the purge valve 206 by the fuel supply line 205 in parallel so that both valves 204, 206 are upstream of a combustor. The flame out vent valve 204 is magnetically coupled to the purge valve 206 through the first magnet 216 and the second magnet 222. The flame out vent valve 204 is positioned so that the first magnet 216 interacts with the second magnet 222. Due to the first magnet 216 and second magnet 222 having the same polarity, the magnets 216, 222 have a repelling effect on one another. There is a distance between the first magnet 216 and the second magnet 222. The repelling force between the first magnet 216 and the second magnet 222 is less than the strength of the first spring 214 or the strength of the second actuator 218. The distance by which the magnets maintain a repelling effect and a distance without overcoming the strength of the first spring 214 or the strength of the second actuator 218 is referred to herein as the equilibrium distance.

In operation, the configuration shown in FIG. 2A illustrates an open configuration in which fuel is able to flow from the fuel metering system, through the flame out vent valve 204, through the fuel supply line 205 and to the combustor. The FADEC 202 determines that the engine is set to run, and then energizes the first actuator 211 to hold the first plug 212 in a retracted position. Holding the first plug 212 in the retracted position allows fuel to flow through the flame out vent valve 204. The retracted position of the first plug 212 positions the first magnet 216 so that the distance between the first magnet 216 and the second magnet 222 is greater than the equilibrium distance. This allows the force balance on the second plug 220 to position the second plug to isolate the purge system from the fuel supply line 205.

In FIG. 2A, the flame out vent valve 204 and purge valve 206 are configured so that when the first plug 212 enables fuel flow from the fuel metering system through the flame out vent valve 204, the second plug 220 is in an extended position to obstruct flow of a gas from the purge system upstream of the purge valve 206 through the purge valve 206. In the example of FIG. 2A, the second plug 220 is spherical and obstructs flow when the second actuator 218 extends to move the second plug into a conical portion of the purge valve 206. In other examples, other complementary geometries may be used for the flame out vent valve 204 or for the purge valve 206 (e.g., rectangular or plug with a rectangular purge valve, triangular plug with a triangular purge valve, etc.). In other examples, the purge valve may include an elastomeric or metallic seal to assist in isolating the purge system from the fuel supply line 205.

The first actuator 211 and second actuator 218 may be implemented as springs, solenoids, piezoelectric stacks, pneumatic actuators, hydraulic actuators, smart metal alloy wires, etc., or a combination thereof. In the example of FIG. 2A, the first actuator 211 is an electromechanical actuator (EMA) and the second actuator 218 is a spring.

Figure 2B:
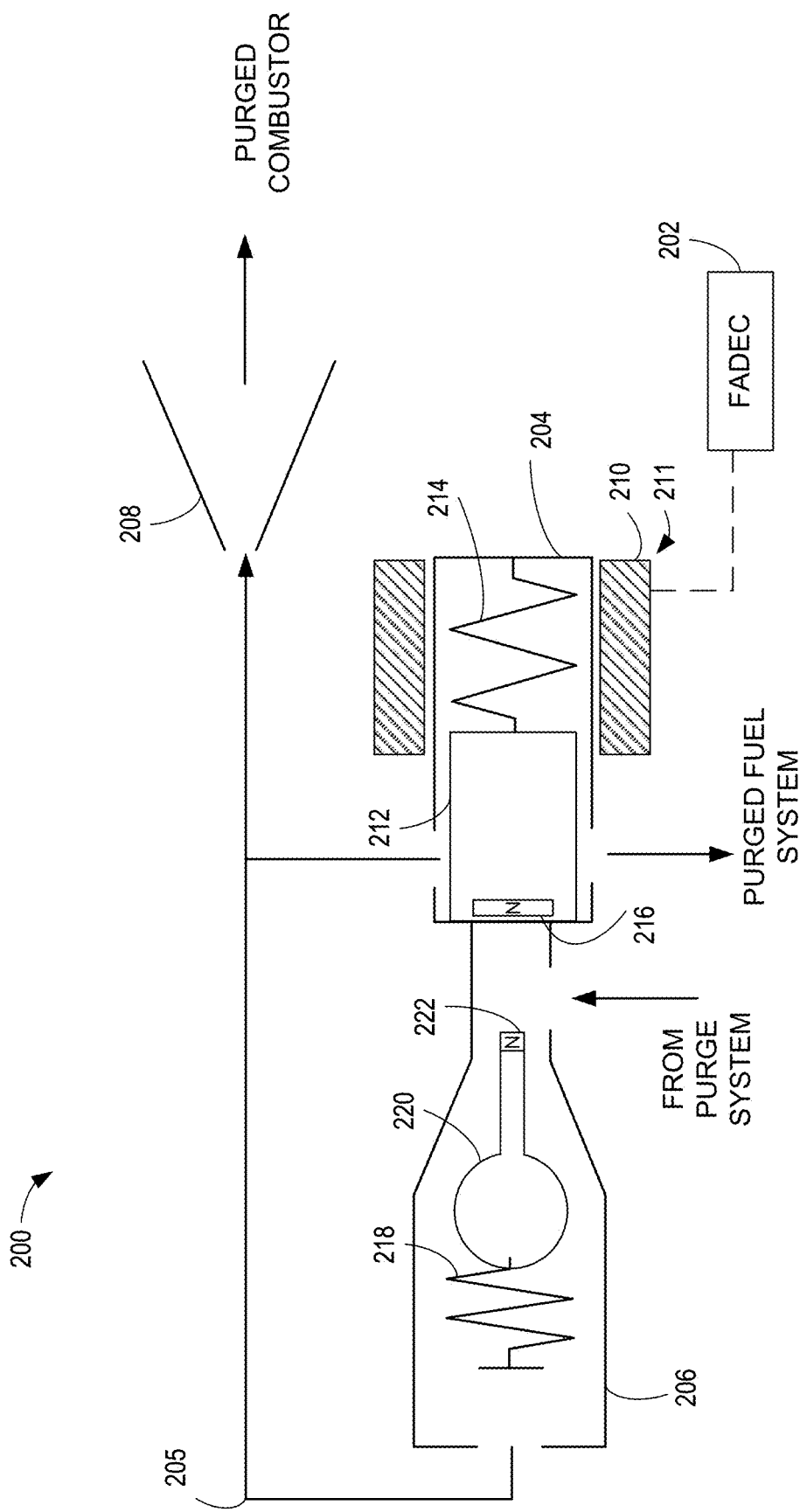
FIG. 2B is a is a block diagram of a fuel system in accordance with the teachings of this disclosure in a closed configuration.

FIG. 2B is a block diagram of the flame out valve system 200 in accordance with the teachings of this disclosure in a closed configuration. In the closed configuration of FIG. 2B, the components of the flame out valve system 200 are positioned in the same manner as in FIG. 2A, but the flame out vent valve 204 is closed, and the purge valve 206 is open.

In operation, the FADEC 202 in FIG. 2B determines that the engine state is set to shutoff. In determining a shutoff engine state, the FADEC 202 sends a signal to the first actuator 211 to de-energize the electrical coils 210. The de-energization of the electrical coils 210 allows the first spring 214 to move to an extended (closed) position. When the first spring 214 moves to the extended (closed) position, the first plug 212 reduces the flow of fuel through the flame out vent valve 204. Additionally, by moving the first plug 212 to the extended (closed) position, the magnetic coupling of the first magnet 216 to the second magnet 222 overcomes the extension force of the second actuator 218 to cause the second plug 220 to move to a retracted (open) position. By moving the second plug 220 to a retracted (open) position, the purge valve 206 opens to allow a non-flammable, pressurized gas (e.g., an inert gas) to be supplied by the purge system and to flow through the purge valve 206 to the fuel supply line 205. The non-flammable, pressurized gas flows through the fuel supply line 205 to the non-sealing fuel nozzle 208 and to the flame out vent valve 204 to purge the fuel supply line 205 so that no excess combustible fuel remains in the fuel supply line 205, combustor, flame out vent valve 204 or fuel system.

In FIG. 2B, the flame out vent valve 204 is configured such that when the first plug 212 moves towards the shutoff position it reduces the area of the flow ports, which the fuel to passes through. This reduces the flow rate to the point where the combustor cannot sustain a flame. In the example of FIG. 2B, the first plug 212 is cylindrical and obstructs flow when the first actuator 211 extends to move the first plug 212 into a cylindrical portion of the flame out vent valve 204 that contains the flow port. This is commonly referred to as a spool in sleeve valve. In other examples, other valve types may be used for the flame out vent valve 204 (e.g., poppet, butterfly, etc.).

The FADEC 202 of FIGS. 2A and 2B may be instantiated (e.g., creating an instance of, bring into being for any length of time, materialize, implement, etc.) by programmable circuitry such as a Central Processor Unit (CPU) executing first instructions. Additionally or alternatively, the FADEC 202 of FIGS. 2A and 2B may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIGS. 2A and 2B may, thus, be instantiated at the same or different times. Some or all of the circuitry of FIGS. 2A and 2B may be instantiated, for example, in one or more threads executing concurrently on hardware and/or in series on hardware. Moreover, in some examples, some or all of the circuitry of FIGS. 2A and 2B may be implemented by microprocessor circuitry executing instructions and/or FPGA circuitry performing operations to implement one or more virtual machines and/or containers.

Figure 3:
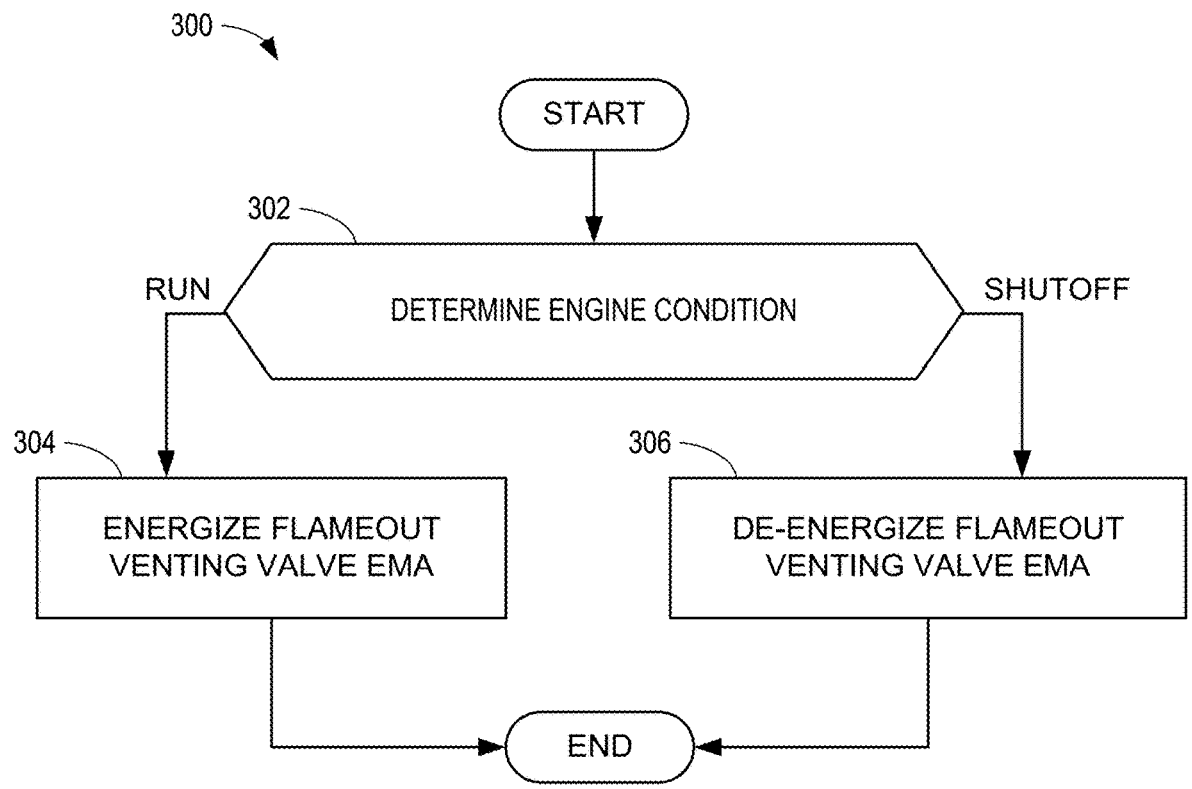
FIG. 3 is a flowchart representative of example machine readable instructions and/or example operations that may be executed, instantiated, and/or performed by example programmable circuitry to implement the controller of FIGS. 2A and 2B.

In some examples, the FADEC 202 is instantiated by programmable circuitry executing determination and signaling instructions and/or configured to perform operations such as those represented by the flowchart(s) of FIG. 3.

In some examples, the flame out valve system 200 includes means for determining a state of an engine. For example, the means for determining may be implemented by the FADEC 202. In some examples, the FADEC 202 may be instantiated by programmable circuitry such as the example programmable circuitry 812 of FIG. 8. For instance, the FADEC 202 may be instantiated by the example microprocessor 900 of FIG. 9 executing machine executable instructions such as those implemented by at least blocks 302, 304, 306 of FIG. 3. In some examples, FADEC 202 may be instantiated by hardware logic circuitry, which may be implemented by an ASIC, XPU, or FPGA circuitry configured and/or structured to perform operations corresponding to the machine readable instructions. Additionally or alternatively, the FADEC 202 may be instantiated by any other combination of hardware, software, and/or firmware. For example, the FADEC 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the flame out valve system 200 includes means for controlling a supply of fuel. For example, the means for controlling a supply of fuel may be implemented by the flame out vent valve 204. In some examples, the flame out valve system 200 includes means for controlling a supply of non-flammable, pressurized fluid. For example, the means for controlling a supply of non-flammable, pressurized fluid may be implemented by the purge valve 206.

FIG. 3 is a flowchart representative of example machine readable instructions and/or example operations 300 that may be executed, instantiated, and/or performed by programmable circuitry to determine the engine state and energize or de-energize the flame out vent valve 204 of FIGS. 2A and 2B. The example machine-readable instructions and/or the example operations 300 of FIG. 3 begin at block 302, at which the FADEC 202 of FIGS. 2A and 2B determines the engine state. The engine state can be either run, where the engine is in an on state and supplying fuel to the combustor in order to generate thrust, or in shutoff, where the engine is in an off state where fuel flow to the combustor is limited. In order to achieve the run state when the FADEC 202 determines from engine sensors that the engine state is run (block 302: RUN), the FADEC 202 sends a signal to energize the first actuator 211 of the flame out vent valve 204 of FIGS. 2A and 2B (block 304). When the FADEC 202 determines the engine state is shutoff (block 302: SHUTOFF), the FADEC 202 sends a signal to de-energize the first actuator 211 of the flame out vent valve 204 of FIGS. 2A and 2B (block 306).

Figure 4A:
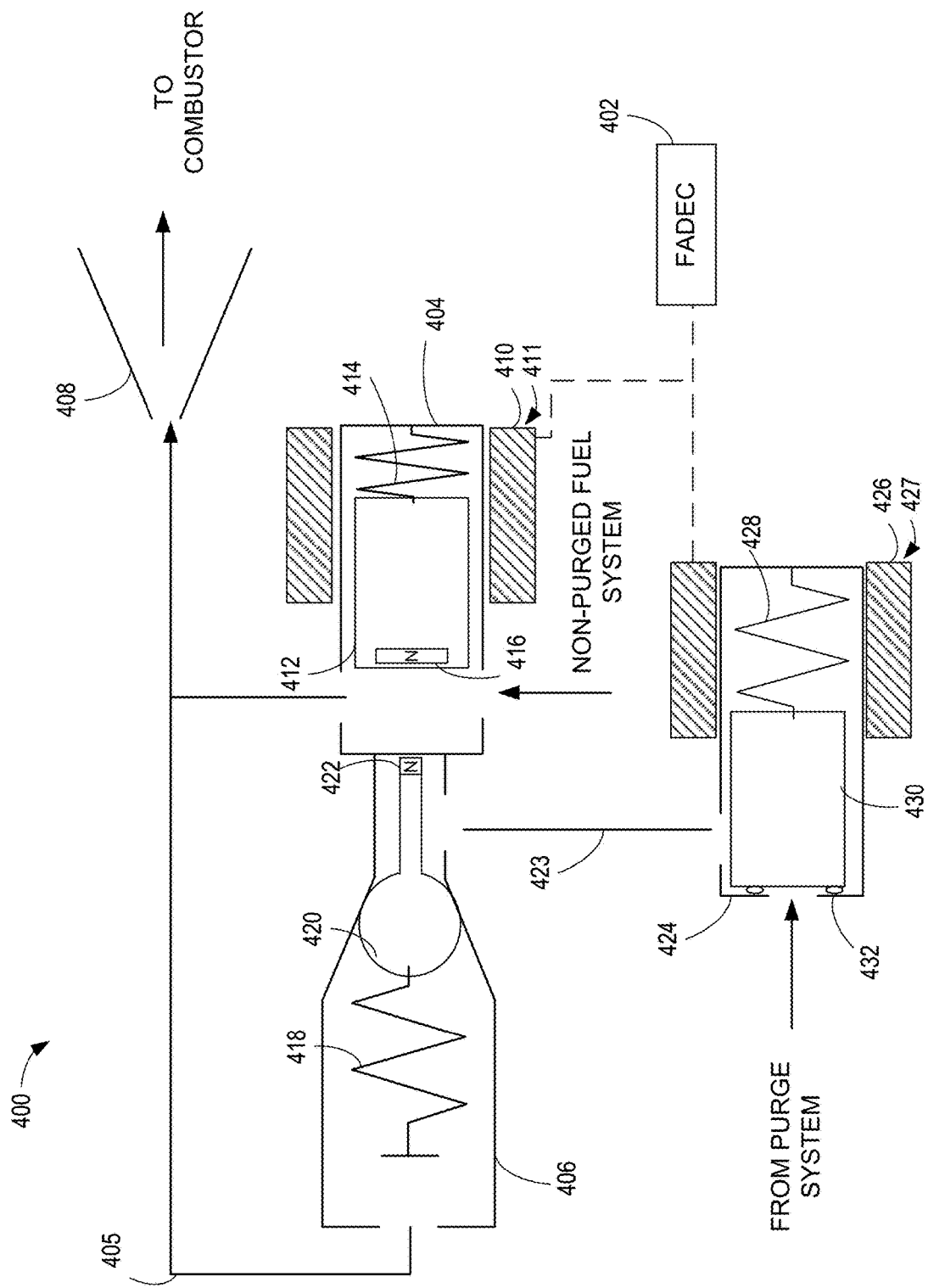
FIG. 4A is a block diagram of a second fuel system in accordance with the teachings of this disclosure in a run configuration.

FIG. 4A is a block diagram of a second flame out valve system 400 in accordance with the teachings of this disclosure in a run configuration. The second flame out valve system 400 includes a FADEC 402, a flame out vent valve 404, a purge valve 406, a fuel supply line 405, a non-sealing fuel nozzle 408, a purge line 423, and an overspeed purge isolation valve 424. The flame out vent valve 404 includes a first actuator 411, which includes a first spring 414 and a first set of electrical coils 410, a first plug 412, and a first magnet 416. The first magnet 416 has a polarity (e.g., N) associated. The purge valve 406 includes a second actuator 418, a second plug 420, and a second magnet 422. The second magnet 422 has a polarity (e.g., N) that is the same polarity as the first magnet 416 (e.g., N). The overspeed purge isolation valve 424 includes a third actuator 427, which includes a second set of electrical coils 426 and a third spring 428, as well as a third plug 430, and an elastomeric seal 432.

Figure 4B:
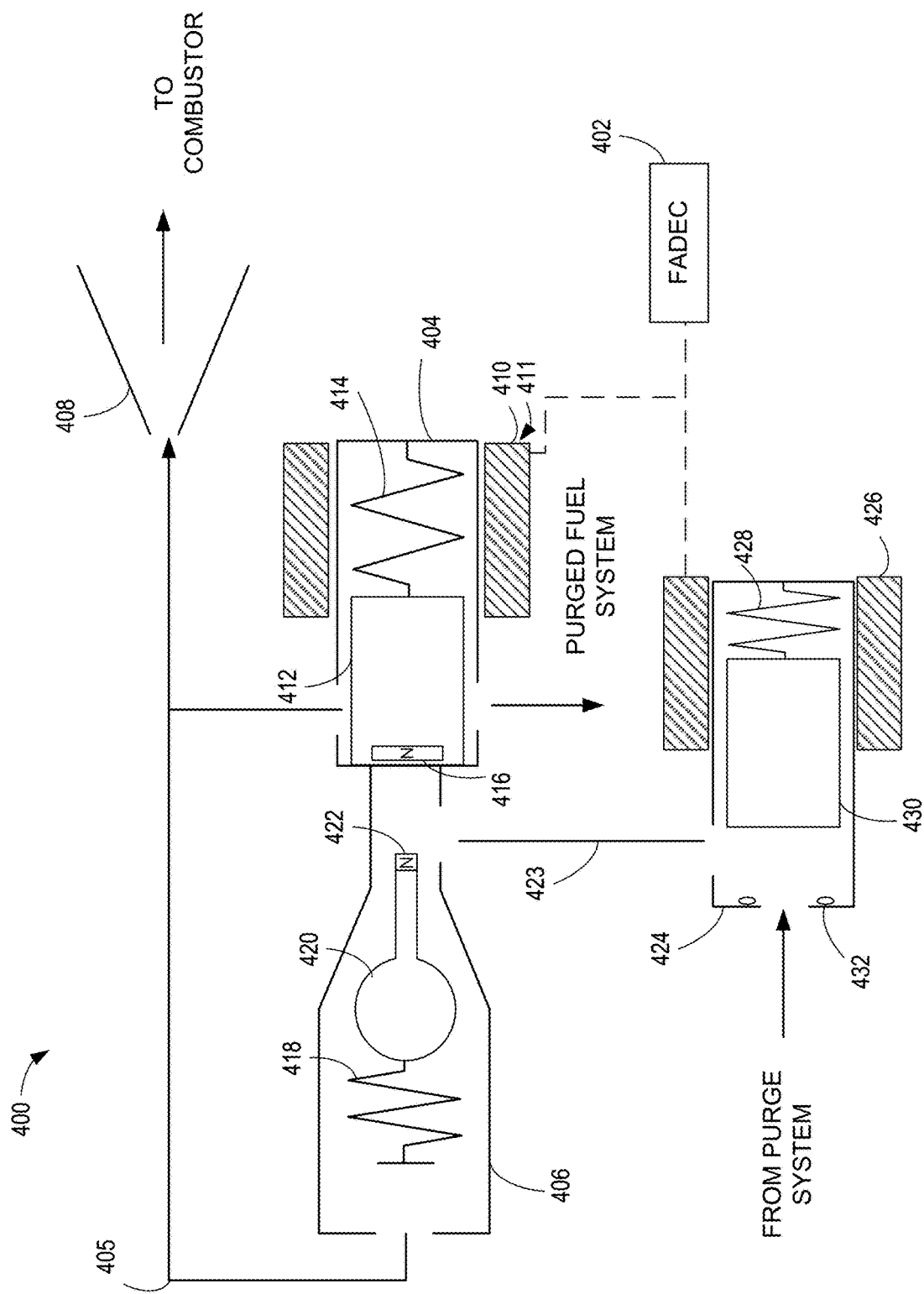
FIG. 4B is a block diagram of a second fuel system in accordance with the teachings of this disclosure in a shutoff configuration.
Figure 4C:
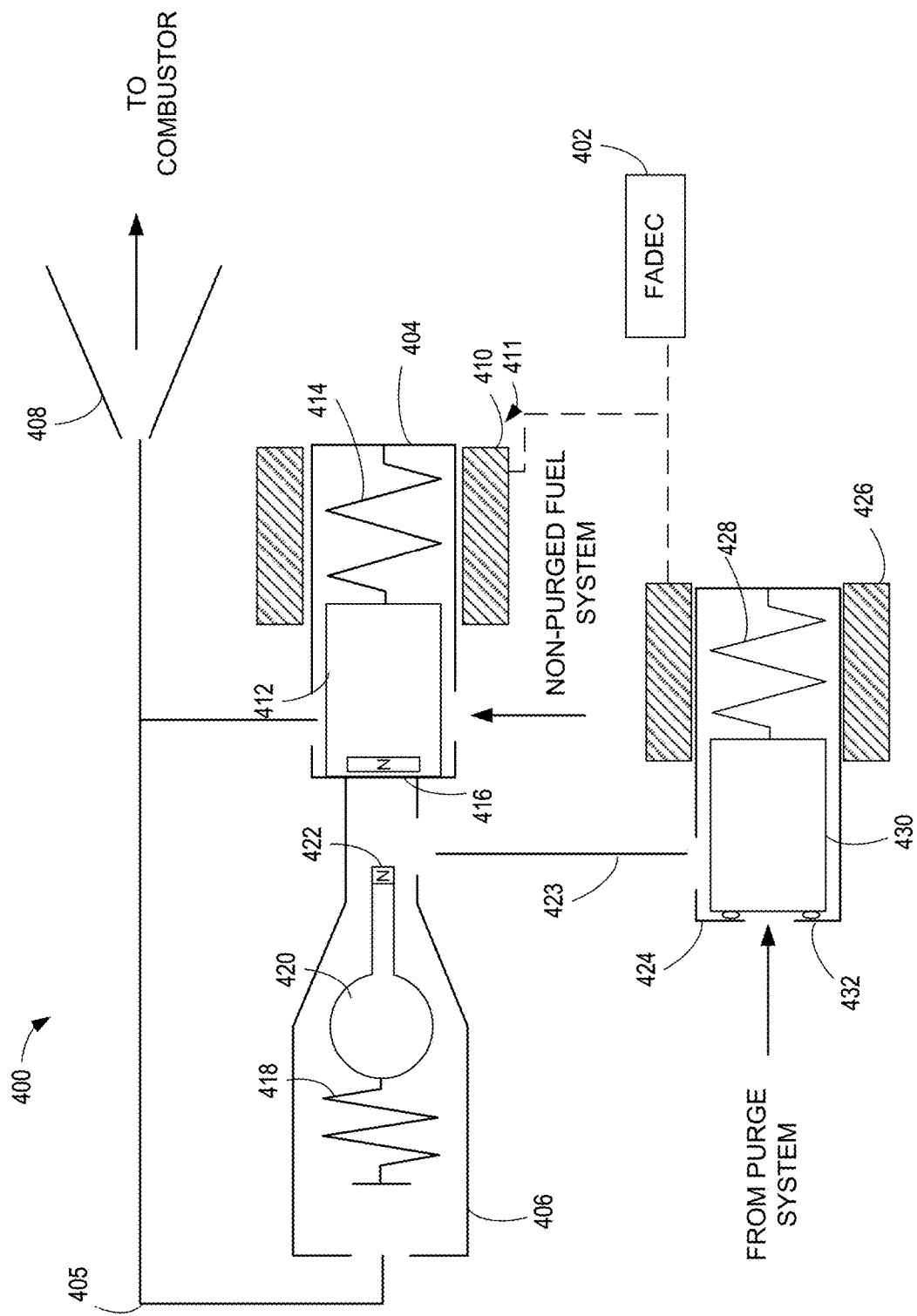
FIG. 4C is a block diagram of a second fuel system in accordance with the teachings of this disclosure in an overspeed shutoff configuration.

In the second flame out valve system 400 OF FIGS. 4A, 4B, and 4C, the overspeed purge isolation valve 424 is downstream of a purge system (not shown in this view). The overspeed purge isolation valve 424 is coupled to the purge valve 406 by the purge line 423. The overspeed purge isolation valve 424 is upstream of the purge valve 406 in serial flow order. The flame out vent valve 404 is in parallel with the overspeed purge isolation valve 424 and the purge valve 406. The flame out vent valve 404, the overspeed purge isolation valve 424, and the purge valve 406 are upstream of the non-sealing fuel nozzle 408 and are connected to the non-sealing fuel nozzle 408 by the fuel supply line 405.

The first spring 414 is connected to the first plug 412 at a first end of the first plug 412. The first plug 412 is coupled to the first magnet 416 at a second end of the first plug 412. Similarly, the second actuator 418 is coupled to a second plug 420 at a first end of the second plug 420. The second magnet 422 is coupled to the second plug 420 at a second end of the second plug 420. In the overspeed purge isolation valve 424, the third spring 428 is coupled to a first end of the third plug 430. The flame out vent valve 404 and the purge valve 406 are aligned so that the first magnet 416 is electromagnetically coupled to the second magnet 422. The relationship between the first magnet 416 and the second magnet 422 is explained below.

The FADEC 402 of FIGS. 4A, 4B, and 4C may be instantiated (e.g., creating an instance of, bring into being for any length of time, materialize, implement, etc.) by programmable circuitry such as a Central Processor Unit (CPU) executing first instructions. Additionally or alternatively, the FADEC 402 of FIGS. 4A, 4B, and 4C may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIGS. 4A and 4B may, thus, be instantiated at the same or different times. Some or all of the circuitry of FIGS. 4A and 4B may be instantiated, for example, in one or more threads executing concurrently on hardware and/or in series on hardware. Moreover, in some examples, some or all of the circuitry of FIGS. 4A, 4B, and 4C may be implemented by microprocessor circuitry executing instructions and/or FPGA circuitry performing operations to implement one or more virtual machines and/or containers.

Figure 5:
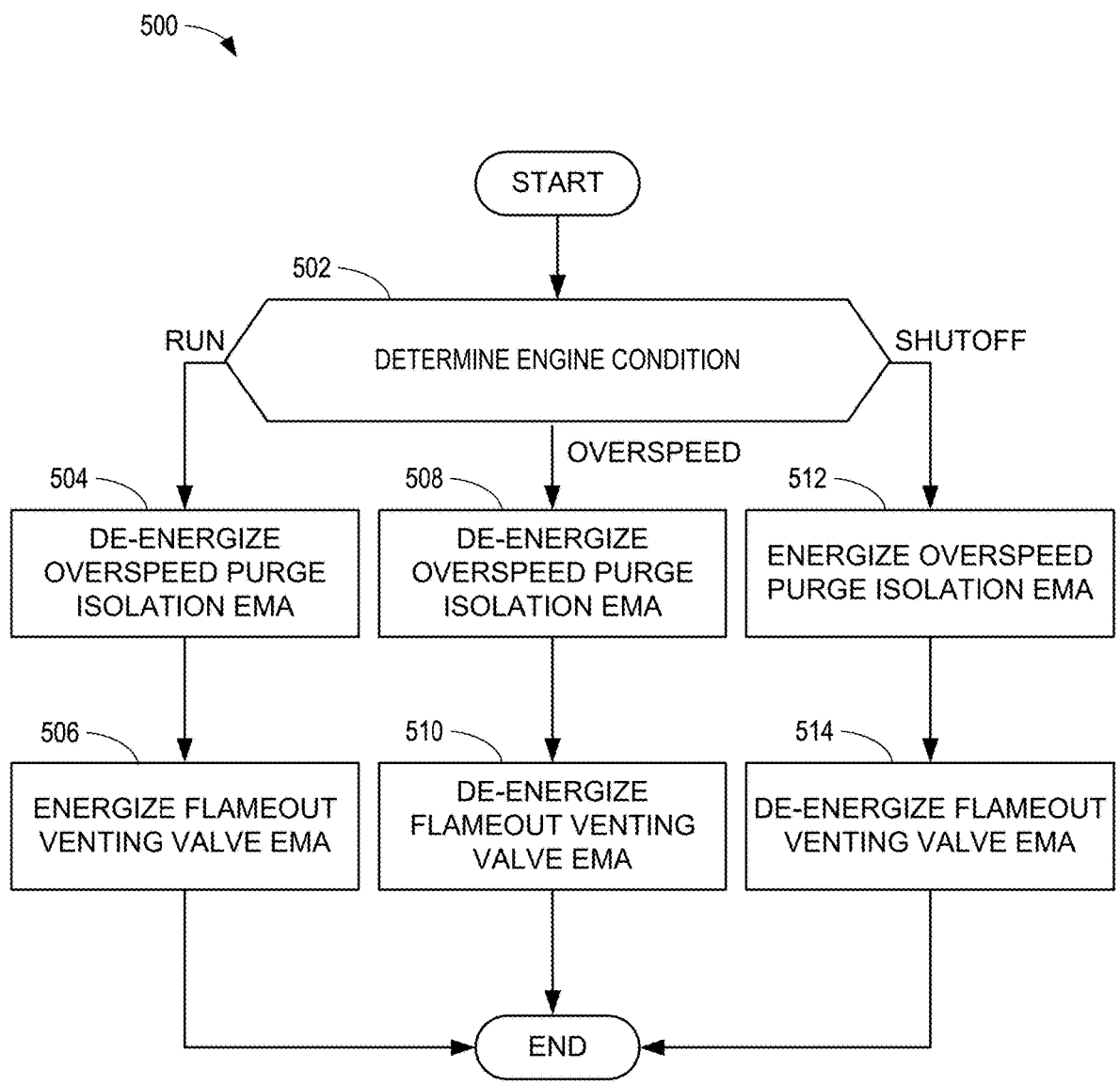
FIG. 5 is a flowchart representative of example machine readable instructions and/or example operations that may be executed, instantiated, and/or performed by example programmable circuitry to implement the controller of FIGS. 4A, 4B, and 4C.

In some examples, the FADEC 402 is instantiated by programmable circuitry executing determination and signaling instructions and/or configured to perform operations such as those represented by the flowchart(s) of FIG. 5.

In some examples, the second flame out valve system 400 includes means for determining a state of an engine. For example, the means for determining may be implemented by the FADEC 402. In some examples, the FADEC 402 may be instantiated by programmable circuitry such as the example programmable circuitry 812 of FIG. 8. For instance, the FADEC 402 may be instantiated by the example microprocessor 900 of FIG. 9 executing machine executable instructions such as those implemented by at least blocks 502, 504, 506, 508, 510, 512, and 514 of FIG. 5. In some examples, FADEC 402 may be instantiated by hardware logic circuitry, which may be implemented by an ASIC, XPU, or FPGA circuitry configured and/or structured to perform operations corresponding to the machine readable instructions. Additionally or alternatively, the FADEC 402 may be instantiated by any other combination of hardware, software, and/or firmware. For example, the FADEC 402 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the second flame out valve system 400 includes means for controlling a supply of fuel. For example, the means for controlling a supply of fuel may be implemented by the flame out vent valve 404. In some examples, the second flame out valve system 400 includes means for controlling a supply of non-flammable, pressurized fluid. For example, the means for controlling a supply of non-flammable, pressurized fluid may be implemented by the purge valve 406.

FIG. 4B illustrates the second flame out valve system 400 in a shutoff configuration. In operation the FADEC 402 sends a signal to the first actuator 411 to de-energize the electrical coils 410. The de-energization of the electrical coils 410 allows the first spring 414 to move to an extended (closed) position. When the first spring 414 moves to the extended (closed) position, the first plug 412 reduces the flow of fuel through the flame out vent valve 404. Additionally, by moving the first plug 412 to the extended (closed) position, the distance between the first magnet 416 and the second magnet 422 is reduced to less than the equilibrium distance. The magnetic force, in conjunction with the purge system pressure acting on the applicable area of the second plug 420 overcomes the force of the second actuator 418 and pressure in the fuel supply line 405 acting on the applicable area of the second plug 420 to cause the second plug 420 to move to a retracted (open) position. By energizing the third actuator 427 of the overspeed purge isolation valve 424, the third spring 428 retracts to remove the third plug 430 from the elastomeric seal 432 and the opening in the overspeed purge isolation valve 424, effectively opening the overspeed purge isolation valve 424.

By achieving the closed state of the flame out vent valve 404, the open state of the purge valve 406, and the open state of the overspeed purge isolation valve 424, the fuel supply is shutoff and non-flammable, pressurized gas (e.g., inert gas) flows from the purge system. The gas flows through the overspeed purge isolation valve 424, through the purge line 423, through the purge valve 406, and through the fuel supply line 405 to the non-sealing fuel nozzle 408 and flame out vent valve 404. By supplying non-flammable pressurized gas in this manner, any remaining fuel in the fuel supply line 405 is pushed out the non-sealing fuel nozzle 408 and the fuel system is purged.

FIG. 4C illustrates the second flame out valve system 400 in an overspeed shutoff configuration. In this configuration, the FADEC 402 of FIG. 4C signals to the first actuator 411 to de-energize the first electrical coils 410, and to the third actuator 427 to de-energize the second electrical coils 426. De-energizing the first electrical coils 410 allows the first spring 414 to move to an extended (closed) position. When the first spring 414 moves to the extended (closed) position, the first plug 412 reduces the flow of fuel through the flame out vent valve 404. Additionally, by moving the first plug 412 to the extended (closed) position, the distance between the first magnet 416 and the second magnet 422 is reduced to less than the equilibrium distance. The magnetic force, in conjunction with the purge system pressure acting on the applicable area of the second plug 420 overcomes the force of the second actuator 418 and pressure in the fuel supply line 405 acting on the applicable area of the second plug 420 to cause the second plug 420 to move to a retracted (open) position. By de-energizing the second electrical coils 426 of the third actuator 427 of the overspeed purge isolation valve 424, the third spring 428 extends the third plug 430 to the elastomeric seal 432 and the opening in the overspeed purge isolation valve 424, effectively closing the overspeed purge isolation valve 424.

In closing the overspeed purge isolation valve 424, the fuel supply line 405 is not purged and instead, fuel is restricted such that the combustor is unable to sustain a flame. Once the turbomachinery has sufficiently reduced speed, the FADEC 402 commands the purge isolation valve 424 to open, pushing the remaining fuel out of the fuel supply line 405 and the fuel system. The overspeed purge isolation valve 424 is configured such that when the third plug 430 moves towards the shutoff position it closes the flow ports, which the purge gas passes through. In the example of FIG. 2B, the third plug 430 is cylindrical and obstructs flow when the third actuator 427 extends to move the third plug 430 into a cylindrical portion of the overspeed purge isolation valve 424 that contains the flow port and stops on an elastomeric seal 432. In other examples, other valve types may be used for the overspeed purge isolation valve 424 (e.g., poppet, butterfly, etc.). The third actuator 427 may be implemented a springs, solenoid, piezoelectric stack, pneumatic actuator, hydraulic actuator, smart metal alloy wire, etc., or a combination thereof. In the example of FIG. 4C, the third actuator 427 is an electro mechanical actuator.

FIG. 5 is a flowchart representative of example machine readable instructions and/or example operations 500 that may be executed, instantiated, and/or performed by programmable circuitry to determine the engine state and actuate the flame out vent valve 404 of FIGS. 4A, 4B and 4C. The example machine-readable instructions and/or the example operations 500 of FIG. 5 begin at block 502, at which the FADEC 402 of FIGS. 4A, 4B, and 4C determines the engine state. The engine can be either in the run state, where the engine is in an on state and supplying fuel to the combustor in order to generate thrust; the shutoff state, where the engine is in an off state where fuel flow to the combustor is limited; or in an overspeed state, where the fuel supply is limited but the fuel is not purged from the system. When the FADEC 402 determines from engine sensors that the engine is in the run state (block 502: RUN), the FADEC 402 sends a signal to close the overspeed purge isolation valve 424 of FIGS. 4A, 4B, and 4C (block 504) and to open the flame out vent valve 404 of FIGS. 4A, 4B, and 4C (block 506). When the FADEC 402 determines that the engine is in the shutoff state (block 502: SHUTOFF), the FADEC 402 sends a signal to open the overspeed purge isolation valve 424 (block 512) and to close the flame out vent valve 404 (block 514). In an overspeed state (block 502: OVERSPEED), the FADEC 402 sends the signal to close the overspeed purge isolation valve 424 (block 508) and to close the flame out vent valve 404 (block 510).

Figure 6A:
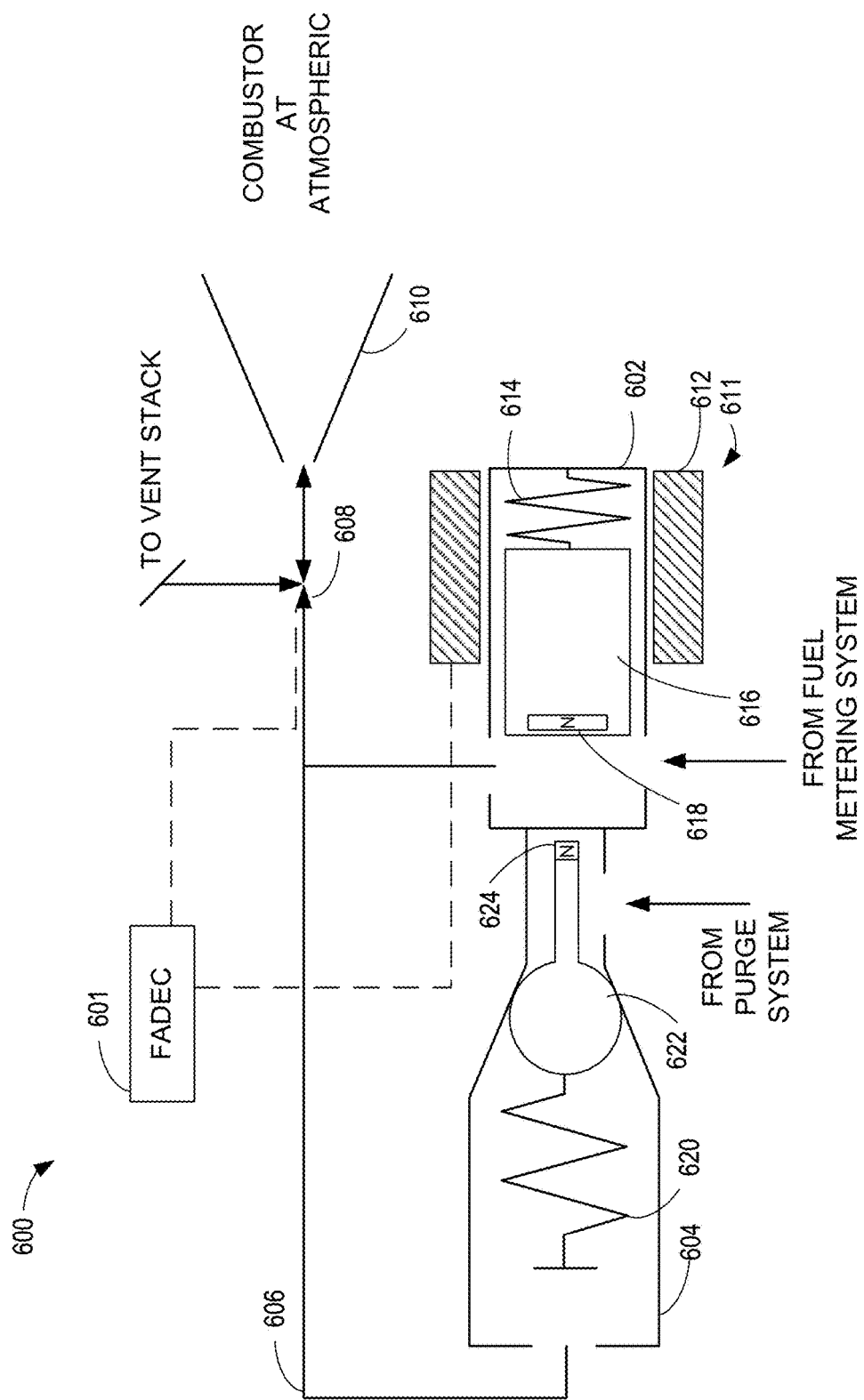
FIG. 6A is a block diagram of a third fuel system in accordance with the teachings of this disclosure in a run configuration.

FIG. 6A is a is a block diagram of a third flame out valve system 600 in accordance with the teachings of this disclosure in run configuration. The third flame out valve system 600 includes a FADEC 601, a flame out vent valve 602, a purge valve 604, a fuel supply line 606, a three-way valve 608, and a non-sealing fuel nozzle 610.

The flame out vent valve 602 includes a first plug 616, a first magnet 618 and a first actuator 611, that includes a first spring 614 and a first set of electrical coils 612. The first spring 614 is coupled to the first plug 616 at a first end of the first plug 616. The first magnet 618 is coupled to the first plug 616 at a second end of the first plug 616. The first plug 616 is controlled by the first actuator 611. The first actuator 611 is connected to and controlled by the FADEC 601.

The purge valve 604 includes a second actuator 620, a second plug 622, and a second magnet 624. The second actuator 620 is coupled to the second plug 622 at a first end of the second plug 622. The second magnet 624 is coupled to the second plug 622 at a second end of the second plug 622.

In the configuration of the third flame out valve system 600, the flame out vent valve 602 is in serial flow connection with the fuel metering system and is downstream of the fuel metering system. The purge valve 604 is in serial flow connection with the purge system and is downstream of the purge system. The flame out vent valve 602 and the purge valve 604 are in parallel flow connection and are connected by the fuel supply line 606 upstream of the three-way valve 608, which is connected to the FADEC 601. The three-way valve 608 is upstream of and coupled to the non-sealing fuel nozzle 610 leading to a combustor. The three-way valve 608 is also upstream of and coupled to a vent stack.

The flame out vent valve 602 and purge valve 604 are configured so that the first magnet 618 and second magnet 624 are magnetically coupled. The first magnet 618 and second magnet 624 have the same polarity so as to repel each other.

In the example of FIG. 6A, the first actuator 611 is energized, which retracts the first plug 616 and opens the flame out vent valve 602. The retracted position of the first plug 616 positions the first magnet 618 so that the distance between the first magnet 618 and the second magnet 624 is greater than the equilibrium distance. This allows the force balance on the second plug 622 to position it to isolate the purge system from the fuel supply line 606.

In operation of the third flame out valve system 600 of FIG. 6A, the third flame out valve system 600 is in a run configuration. In the run configuration, the third flame out valve system 600 functions to enable fuel flow from the fuel metering system through the flame out vent valve 602, through the fuel supply line 606, and to the three-way valve 608. The FADEC 601 determines that the engine is in the run state and instructs the three-way valve 608 to change configuration to allow flow to the non-sealing fuel nozzle 610 and to the combustor.

Figure 6B:
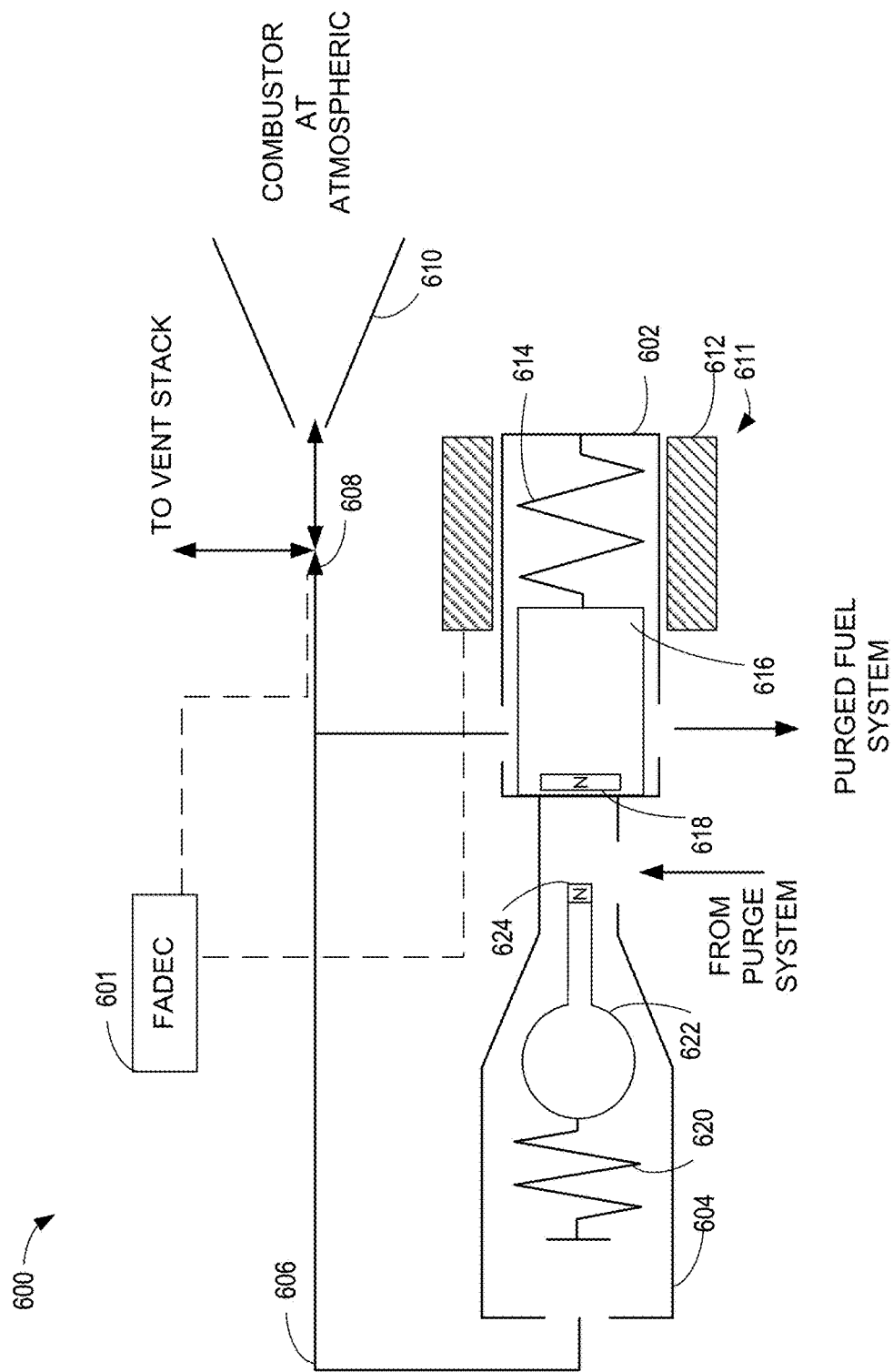
FIG. 6B is a block diagram of a third fuel system in accordance with the teachings of this disclosure in a shutoff configuration.

FIG. 6B is the third flame out valve system 600 of FIG. 6A in a closed configuration. The closed configuration can be used for both engine shutdown and overspeed states. In the closed configuration, the FADEC 601 signals the first actuator 611 to de-energize the electrical coils 612, which allows the first spring 614 to extend. When the first spring 614 is in an extended position, the first plug 616 closes the flame out vent valve 602. Additionally, by moving the first plug 616 to the extended (closed) position, the distance between the first magnet 618 and the second magnet 624 is reduced to less than the equilibrium distance. The magnetic force, in conjunction with the purge system pressure acting on the applicable area of the second plug 622 overcomes the force of the second actuator 620 and pressure in the fuel supply line 606 acting on the applicable area of the second plug 622 to cause the second plug 622 to move to a retracted (open) position. By moving the second plug 622 to a retracted (open) position, the purge valve 604 opens to allow a non-flammable, pressurized gas (e.g., an inert gas) to flow.

In the closed configuration, the FADEC 601 de-energizes the first actuator 611, which closes the flame out vent valve 602. The FADEC 601 also controls the three-way valve 608 to close the opening to the non-sealing fuel nozzle 610, which opens the three-way valve 608 to the vent stack. As a result, the fuel supply to the non-sealing fuel nozzle 610 and combustor is stopped. The opening of the purge valve 604 opens the fuel supply line 606 to the purge system, which is supplying non-flammable, pressurized gas. The non-flammable, pressurized gas flows through the fuel supply line 606 and purges the system by pushing any fuel trapped in the fuel supply line 606 to the three-way valve 608 and out to the vent stack. The non-flammable, pressurized gas also flows through the flame out vent valve 602 purging the fuel system.

By allowing any fuel trapped in the fuel supply line 606 to flow through the three-way valve 608 and out the vent stack, the FADEC 601 and three-way valve 608 obstruct fuel flow to the combustor when the engine is in a shutoff or overspeed state. This ensures that the combustor is not fueled to produce heat and inadvertently cause the engine to speed up temporarily.

The FADEC 601 of FIGS. 6A and 6B may be instantiated (e.g., creating an instance of, bring into being for any length of time, materialize, implement, etc.) by programmable circuitry such as a Central Processor Unit (CPU) executing first instructions. Additionally or alternatively, the FADEC 601 of FIGS. 6A and 6B may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIGS. 6A and 6B may, thus, be instantiated at the same or different times. Some or all of the circuitry of FIGS. 6A and 6B may be instantiated, for example, in one or more threads executing concurrently on hardware and/or in series on hardware. Moreover, in some examples, some or all of the circuitry of FIGS. 6A and 6B may be implemented by microprocessor circuitry executing instructions and/or FPGA circuitry performing operations to implement one or more virtual machines and/or containers.

Figure 7:
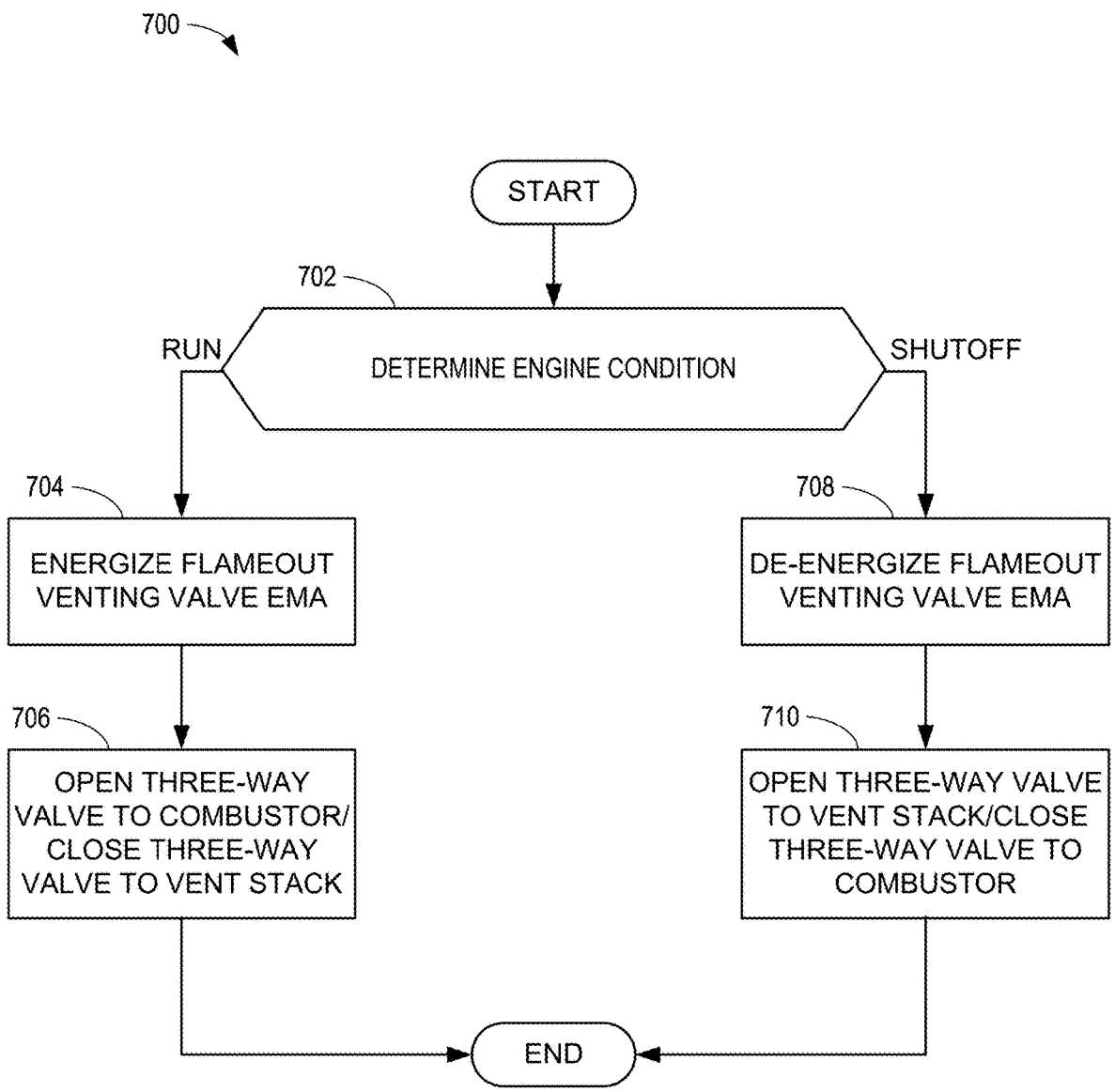
FIG. 7 is a flowchart representative of example machine readable instructions and/or example operations that may be executed, instantiated, and/or performed by example programmable circuitry to implement the controller of FIGS. 6A and 6B.

In some examples, the FADEC 601 is instantiated by programmable circuitry executing determination and signaling instructions and/or configured to perform operations such as those represented by the flowchart(s) of FIG. 7.

In some examples, the third flame out valve system 600 includes means for determining a condition or an operating state of an engine. For example, the means for determining may be implemented by the FADEC 601. In some examples, the FADEC 601 may be instantiated by programmable circuitry such as the example programmable circuitry 812 of FIG. 8. For instance, the FADEC 601 may be instantiated by the example microprocessor 900 of FIG. 9 executing machine executable instructions such as those implemented by at least blocks 702, 704, 706, 708, 710 of FIG. 7. In some examples, FADEC 601 may be instantiated by hardware logic circuitry, which may be implemented by an ASIC, XPU, or FPGA circuitry configured and/or structured to perform operations corresponding to the machine readable instructions. Additionally or alternatively, the FADEC 601 may be instantiated by any other combination of hardware, software, and/or firmware. For example, the FADEC 601 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the third flame out valve system 600 includes means for controlling a supply of fuel. For example, the means for controlling a supply of fuel may be implemented by the flame out vent valve 602. In some examples, the third flame out valve system 600 includes means for controlling a supply of non-flammable, pressurized fluid. For example, the means for controlling a supply of non-flammable, pressurized fluid may be implemented by the purge valve 604.

FIG. 7 is a flowchart representative of example machine readable instructions and/or example operations 700 that may be executed, instantiated, and/or performed by programmable circuitry to determine the engine state and actuate the flame out vent valve 602 and three way valve 608 of FIGS. 6A and 6B. The example machine-readable instructions and/or the example operations 700 of FIG. 7 begin at block 702, at which the FADEC 601 of FIGS. 6A, and 6B determines the engine state. The engine state can be either run, where the engine is in an on state and supplying fuel to the combustor in order to generate thrust, or shutoff, where the engine is in an off state stopping fuel flow to the combustor. In order to achieve the run state when the FADEC 601 determines from engine sensors that the engine state is run (block 702: RUN), the FADEC 601 sends a signal to energize the first actuator 611 of the flame out vent valve 602 of FIGS. 6A and 6B (block 704). The FADEC 601 also sends a signal to the three-way valve 608 of FIGS. 6A and 6B to open a pathway to the combustor while closing the three-way valve 608 pathway to the vent stack (block 706). In the event the FADEC 601 determines the engine state is shutoff (block 702: SHUTOFF), the FADEC 601 sends a signal to de-energize the first actuator 611 of FIGS. 6A and 6B (block 708). The FADEC 601 also sends a signal to the three-way valve 608 to close the valve pathway to the combustor while opening the three-way valve 608 pathway to the vent stack (block 710).

Figure 8:
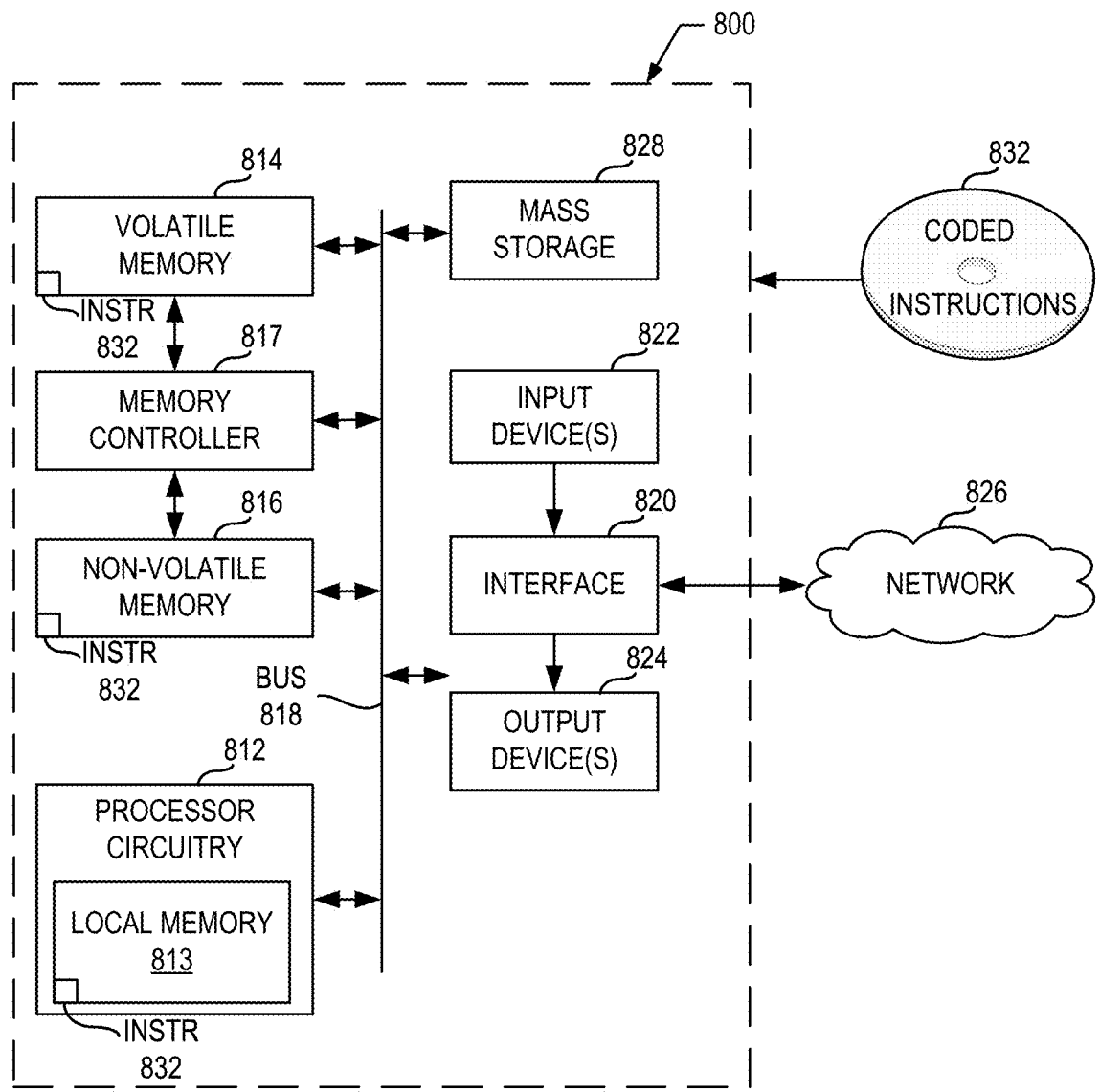
FIG. 8 is a block diagram of an example processing platform including programmable circuitry structured to execute, instantiate, and/or perform the example machine readable instructions and/or perform the example operations of FIGS. 3, 5, and 7 to implement the full authority digital engine controller of FIGS. 2A, 2B, 4A, 4B, 4C 6A, and 6B.

FIG. 8 is a block diagram of an example programmable circuitry platform 800 structured to execute and/or instantiate the example machine-readable instructions and/or the example operations of FIGS. 3, 5, and 7 to implement the FADEC 202, 402 and/or 601 of FIGS. 2A, 2B, 4A, 4B, 4C, 6A, and/or 6B. The programmable circuitry platform 800 can be, for example, a server, a personal computer, a workstation, a self-learning machine (e.g., a neural network), or any other type of computing and/or electronic device.

The programmable circuitry platform 800 of the illustrated example includes programmable circuitry 812. The programmable circuitry 812 of the illustrated example is hardware. For example, the programmable circuitry 812 can be implemented by one or more integrated circuits, logic circuits, FPGAs, microprocessors, CPUs, GPUs, DSPs, and/or microcontrollers from any desired family or manufacturer. The programmable circuitry 812 may be implemented by one or more semiconductor based (e.g., silicon based) devices.

The programmable circuitry 812 of the illustrated example includes a local memory 813 (e.g., a cache, registers, etc.). The programmable circuitry 812 of the illustrated example is in communication with main memory, which includes a volatile memory 814 and a non-volatile memory 816, by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory, and more specifically the volatile memory 814 and non-volatile memory 816 of the illustrated example is controlled by a memory controller 817. In some examples, the memory controller 817 may be implemented by one or more integrated circuits, logic circuits, microcontrollers from any desired family or manufacturer, or any other type of circuitry to manage the flow of data going to and from the volatile memory 814 and non-volatile memory 816.

The programmable circuitry platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user (e.g., a human user, a machine user, etc.) to enter data and/or commands into the programmable circuitry 812. The input device(s) 822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 800 of the illustrated example also includes one or more mass storage discs or devices 828 to store firmware, software, and/or data. Examples of such mass storage discs or devices 828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

Machine readable, or coded instructions 832, which may be implemented by the machine readable instructions of FIGS. 3, 5, and 7, may be stored in the mass storage device 828, in the volatile memory 814, in the non-volatile memory 816, and/or on at least one non-transitory computer readable storage medium such as a CD or DVD which may be removable.

Figure 9:
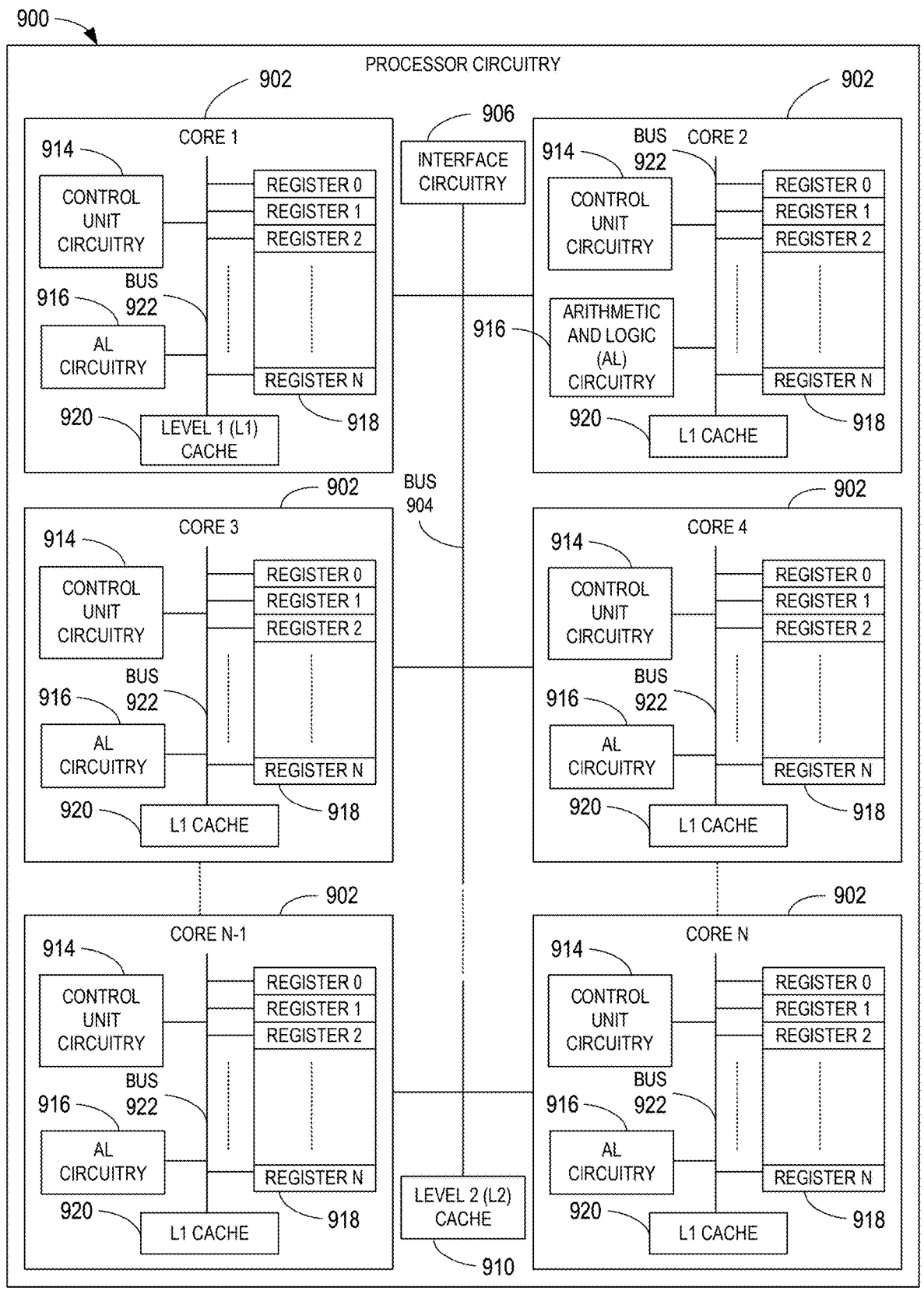
FIG. 9 is a block diagram of an example implementation of the programmable circuitry of FIG. 8.

FIG. 9 is a block diagram of an example implementation of the programmable circuitry 812 of FIG. 8. In this example, the programmable circuitry 812 of FIG. 8 is implemented by a microprocessor 900. For example, the microprocessor 900 may be a general-purpose microprocessor (e.g., general-purpose microprocessor circuitry). The microprocessor 900 executes some or all of the machine-readable instructions of the flowcharts of FIGS. 3, 5, and 7 to effectively instantiate the FADEC as logic circuits to perform operations corresponding to those machine readable instructions. In some such examples, the circuitry of the FADEC is instantiated by the hardware circuits of the microprocessor 900 in combination with the machine-readable instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 3, 5, and 7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the volatile memory 814 and non-volatile memory 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating-point operations. In yet other examples, the AL circuitry 916 may include first AL circuitry that performs integer-based operations and second AL circuitry that performs floating-point operations. In some examples, the AL circuitry 916 may be referred to as an Arithmetic Logic Unit (ALU).

The registers 918 are semiconductor-based structures to store data and/or instructions such as results of one or more of the operations performed by the AL circuitry 916 of the corresponding core 902. For example, the registers 918 may include vector register(s), SIMD register(s), general-purpose register(s), flag register(s), segment register(s), machine-specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure, such as by being distributed throughout the core 902 to shorten access time. The second bus 922 may be implemented by at least one of an I2C bus, a SPI bus, a PCI bus, or a PCIe bus.

Each core 902 and/or, more generally, the microprocessor 900 may include additional and/or alternate structures to those shown and described. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described in one or more integrated circuits (ICs) contained in one or more packages.

The microprocessor 900 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 900, in the same chip package as the microprocessor 900 and/or in one or more separate packages from the microprocessor 900.

Figure 10:
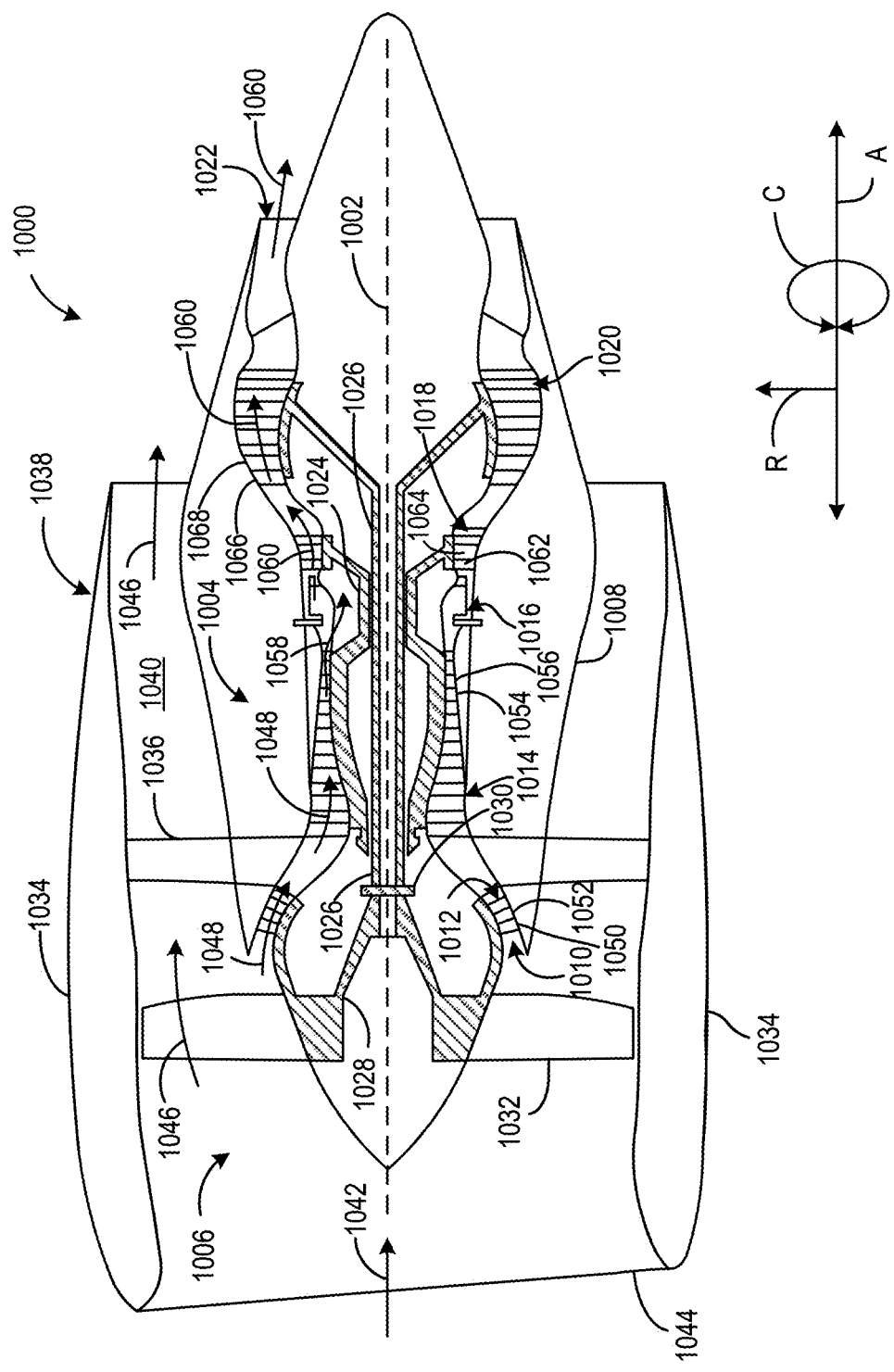
FIG. 10 illustrates a schematic cross-sectional view of an example of a turbofan engine implementing the teachings of this disclosure.

FIG. 10 is a schematic cross-sectional view of an example turbofan engine 1000 that may incorporate the various examples disclosed herein. As shown in FIG. 10, the turbofan engine 1000 defines a longitudinal or axial centerline axis 1002 extending therethrough for reference. In general, the turbofan engine 1000 can include a core turbine or a core turbine engine 1004 disposed downstream from a fan section 1006.

The core turbine engine 1004 can generally include a substantially tubular outer casing 1008 that defines an annular inlet 1010. The outer casing 1008 can be formed from multiple segments. The outer casing 1008 encloses, in serial flow relationship, a compressor section having a booster or low-pressure compressor 1012 ("LP compressor 1012") and a high-pressure compressor 1014 ("HP compressor 1014"), a combustion section 1016, a turbine section having a high-pressure turbine 1018 ("HP turbine 1018") and a low-pressure turbine 1020 ("LP turbine 1020"), and an exhaust section 1022. A high-pressure shaft or spool 1024 ("HP shaft 1024") drivingly couples the HP turbine 1018 and the HP compressor 1014. A low-pressure shaft or spool 1026 ("LP shaft 1026") drivingly couples the LP turbine 1020 and the LP compressor 1012. The LP shaft 1026 can also couple to a fan shaft or spool 1028 of the fan section 1006. In some examples, the LP shaft 1026 can couple directly to the fan shaft 1028 (i.e., a direct-drive configuration). In alternative configurations, the LP shaft 1026 may couple to the fan shaft 1028 via a reduction gearbox 1030 (i.e., an indirect-drive or geared-drive configuration).

As shown in FIG. 10, the fan section 1006 includes a plurality of fan blades 1032 ("fan" 1032) coupled to and extending radially outwardly from the fan shaft 1028. An annular fan casing or nacelle 1034 circumferentially encloses the fan section 1006 and/or at least a portion of the core turbine engine 1004. The nacelle 1034 can be supported relative to the core turbine engine 1004 by a forward mount 1036. Furthermore, a downstream section 1038 of the nacelle 1034 can enclose an outer portion of the core turbine engine 1004 to define a bypass airflow passage 1040 therebetween.

As illustrated in FIG. 10, air 1042 enters an intake or inlet portion 1044 of the turbofan engine 1000 during operation thereof. A first portion 1046 of the air 1042 flows into the bypass airflow passage 1040, while a second portion 1048 of the air 1042 flows into the inlet 1010 of the LP compressor 1012. One or more sequential stages of LP compressor stator vanes 1050 and LP compressor rotor blades 1052 (e.g., turbine blades) coupled to the LP shaft 1026 progressively compress the second portion 1048 of the air 1042 flowing through the LP compressor 1012 en route to the HP compressor 1014. Next, one or more sequential stages of HP compressor stator vanes 1054 and HP compressor rotor blades 1056 coupled to the HP shaft 1024 further compress the second portion 1048 of the air 1042 flowing through the HP compressor 1014. This provides compressed air 1058 to the combustion section 1016 where it mixes with fuel and burns to provide combustion gases 1060. In FIG. 10, the turbofan engine 1000 utilizes methane as fuel, which enables some of the difficulties associated with the utilization of hydrogen as fuel to be avoided, but other concerns arise and the overall performance of the turbofan engine 1000 is reduced. For instance, a volumetric flow rate of the methane into the combustion section 1016 is not a concern and, instead, the methane must be split into small enough particles for combustion. Moreover, the turbofan engine 1000 has a reduced fuel efficiency as a result of utilizing methane as opposed to hydrogen.

In FIG. 10, the combustion gases 1060 flow through the HP turbine 1018 where one or more sequential stages of HP turbine stator vanes 1062 and HP turbine rotor blades 1064 coupled to the HP shaft 1024 extract a first portion of kinetic and/or thermal energy therefrom. This energy extraction supports operation of the HP compressor 1014. The combustion gases 1060 then flow through the LP turbine 1020 where one or more sequential stages of LP turbine stator vanes 1066 and LP turbine rotor blades 1068 coupled to the LP shaft 1026 extract a second portion of thermal and/or kinetic energy therefrom. This energy extraction causes the LP shaft 1026 to rotate, thereby supporting operation of the LP compressor 1012 and/or rotation of the fan shaft 1028. The combustion gases 1060 then exit the core turbine 1004 through the exhaust section 1022 thereof.

Along with the turbofan engine 1000, the core turbine 1004 serves a similar purpose and sees a similar environment in land-based turbines, turbojet engines in which the ratio of the first portion 1046 of the air 1042 to the second portion 1048 of the air 1042 is less than that of a turbofan, and unducted fan engines in which the fan section 1006 is devoid of the nacelle 1034. In each of the turbofan, turbojet, and unducted engines, a speed reduction device (e.g., the reduction gearbox 1030) can be included between any shafts and spools. For example, the reduction gearbox 1030 can be disposed between the LP shaft 1026 and the fan shaft 1028 of the fan section 1006.

As depicted therein, the turbofan engine 1000 defines an axial direction A, a radial direction R, and a circumferential direction C. In general, the axial direction A extends generally parallel to the axial centerline axis 1002, the radial direction R extends orthogonally outward from the axial centerline axis 1002, and the circumferential direction C extends concentrically around the axial centerline axis 1002.

Figure 11:
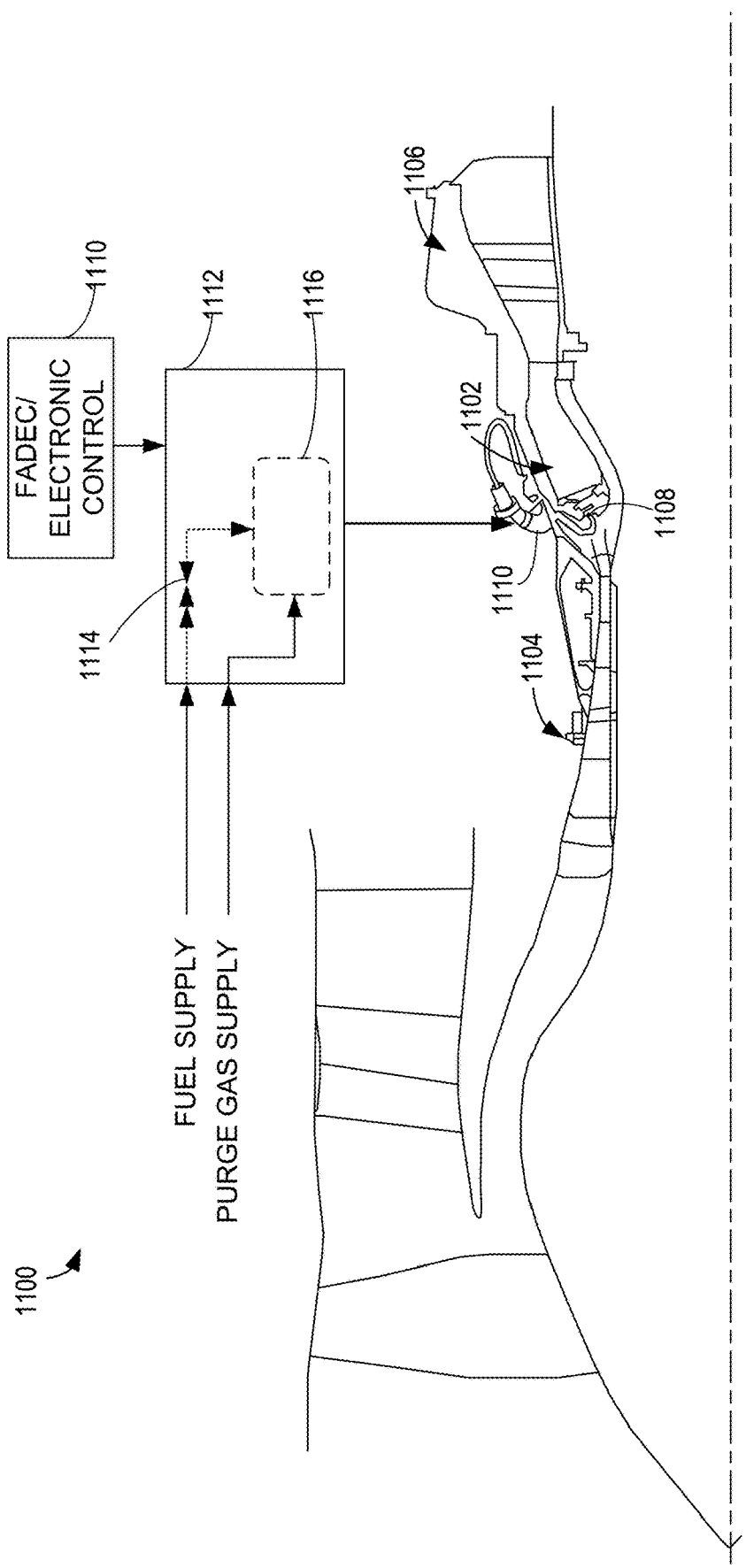
FIG. 11 illustrates a schematic cross-sectional view of an example turbofan engine in accordance with the teachings disclosed herein.

FIG. 11 illustrates a schematic cross-sectional view of an example turbofan engine 1100 that may include various examples disclosed herein. In FIG. 11, the turbofan engine 1100 includes a combustor 1102 between a compressor section 1104 and a turbine section 1106. In FIG. 11, the combustor 1102 includes nozzles 1108 in connection with a fuel circuit 1112 (e.g., a fluid line, a fuel duct, etc.) that injects fuel and, at times, inert gas into the combustor 1102. In FIG. 11, the turbofan engine 1100 includes a FADEC 1110 communicatively coupled to the fuel circuit 1112. The fuel circuit 1112 includes a fuel metering valve 1114 and shutoff and purge valves 1116 disclosed herein. The shutoff and purge valves 1116 may be any of the examples disclosed herein, such as the flame out valve system 200, the second flame out valve system 400, or the third flame out valve system 600.

From the foregoing, it will be appreciated that example systems, apparatus, articles of manufacture, and methods have been disclosed that rapidly reduce fuel flow to flame out a combustor and purge the fuel system.

Example flame out valves, vent valves and associated controls are disclosed. Further aspects of the disclosure are provided by the subject matter of the following clauses:

An apparatus to regulate a gaseous fuel system, the apparatus comprising a first valve connected to a fuel supply line, the first valve including a first plug to control a flow of fuel, a first spring coupled to a first end of the first plug, and a first magnet coupled to a second end of the first plug, a second valve connected to a purge system in parallel with the fuel supply line, the second valve including a second plug to control a flow of a fluid, a second spring coupled to a first end of the second plug, and a second magnet coupled to a second end of the second plug, the second magnet magnetically coupled to the first magnet, and an actuator coupled to at least one of the first or the second valve.

The apparatus of any preceding clause, further including a third valve upstream of the second valve, the third valve including a third plug to control the flow of the fluid, and a third spring coupled to a first end of the third plug.

The apparatus of any preceding clause, wherein the actuator is a first actuator, and further including a second actuator, the second actuator coupled to the third valve.

The apparatus of any preceding clause, wherein the second actuator is controlled by a controller, the controller to signal the second actuator to actuate when an engine overspeed state is determined.

The apparatus of any preceding clause, wherein the first valve and the second valve are upstream of a combustor in an engine.

The apparatus of any preceding clause, further including a three-way valve downstream of the first valve and the second valve, the three-way valve upstream of the combustor.

The apparatus of any preceding clause, wherein the three-way valve is coupled to a vent stack.

The apparatus of any preceding clause, wherein the three-way valve is controlled by a controller, the controller to open flow from the first valve to the combustor when the engine is in a run state.

The apparatus of any preceding clause, wherein the three-way valve is controlled by a controller, the controller to open flow from the second valve to the vent stack when the engine is in at least one of a shut off state or overspeed state.

A system to reduce fuel combustion, the system comprising a controller to determine an operating state of an engine, a first valve of a fuel metering system connected to a fuel supply line, the first valve controlled by the controller based on the operating state, and a second valve of a purge system connected to the fuel supply line, the second valve in parallel with the first valve, the second valve magnetically coupled to the first valve.

The system of any preceding clause, wherein a configuration of the first valve is changed by an actuator.

The system of any preceding clause, further including a third valve upstream of the second valve, the third valve to control a flow of non-flammable, pressurized fluid based on a signal sent by the controller, the signal sent by the controller based on the determined state of the engine.

The system of any preceding clause, wherein an actuator of the third valve is controlled by the controller to adjust configuration of the third valve.

The system of any preceding clause, wherein the first valve and the second valve are upstream of a combustor in an engine.

The system of any preceding clause, further including a three-way valve downstream of the first valve and the second valve, the three-way valve upstream of the combustor.

The system of any preceding clause, wherein the three-way valve is coupled to a vent stack.

The system of any preceding clause, wherein the three-way valve is controlled by the controller, the controller to open flow from the first valve, close the three-way valve to the vent stack, and to open the three way valve to the combustor when the engine is in a running state.

The system of any preceding clause, wherein the three-way valve is controlled by a controller, the controller to close fuel flow from the first valve, close the three-way valve to the combustor, and open the three way valve to the vent stack when the engine is in at least one of a shut off state or overspeed state.

An apparatus to control fuel flow to a combustor, the apparatus comprising: interface circuitry, machine readable instructions, and programmable circuitry to at least one of instantiate or execute the machine readable instructions determine an engine state and to actuate an electromagnetic actuator based on the determined engine state.

The apparatus of any preceding clause, wherein the actuator is a first actuator and controls the flow of a fuel, the actuator magnetically coupled to a second actuator, the second actuator to control the flow of a fluid.

The apparatus of any preceding clause, wherein the second actuator is closed when the first actuator is open.

The apparatus of any preceding clause, wherein the second actuator is open when the first actuator is closed.

The apparatus of any preceding clause, further including the machine readable instructions to control the configuration of a three way valve downstream of the first actuator.

The apparatus of any preceding clause, wherein the three way valve is coupled to a vent stack.

The apparatus of any preceding clause, further including the machine readable instructions to actuate a third actuator upstream of the second actuator.

A non-transitory machine readable storage medium comprising instructions to cause programmable circuitry to at least determine an engine state and to actuate an actuator based on the determined engine state.

The non-transitory machine readable storage medium of any preceding clause, wherein the actuator is a first actuator and controls the flow of a fuel, the first actuator magnetically coupled to a second actuator, the second actuator to control the flow of a fluid.

The non-transitory machine readable storage medium of any preceding clause, wherein the second actuator is closed when the first actuator is open.

The non-transitory machine readable storage medium of any preceding clause, wherein the second actuator is open when the first actuator is closed.

The non-transitory machine readable storage medium of any preceding clause, further including the machine readable instructions to control the configuration of a three way valve downstream of the actuator.

The non-transitory machine readable storage medium of any preceding clause, wherein the three way valve is coupled to a vent stack.

The non-transitory machine readable storage medium of any preceding clause, further including the machine readable instructions to actuate a third actuator upstream of the second actuator.

A system for controlling fuel flow to a combustor, the system comprising a means for determining an engine state, a first means for controlling a supply of fuel, the first means controlled by the engine state determiner, and a second means for controlling a supply of non-flammable, pressurized fluid.

The system, wherein the second means is magnetically coupled to the first means so that when the first means actuates, the second means actuates.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to regulate a gaseous fuel system, the apparatus comprising:
    a first valve connected to a fuel supply line, the first valve including:
        a first plug to control a flow of fuel;
        a first spring coupled to a first end of the first plug; and
        a first magnet coupled to a second end of the first plug;
    a second valve connected to a purge system in parallel with the fuel supply line, the second valve including:
        a second plug to control a flow of a fluid;
        a second spring coupled to a first end of the second plug; and
        a second magnet coupled to a second end of the second plug, the second magnet magnetically coupled to the first magnet; and
    an actuator coupled to at least one of the first valve or the second valve.

2. The apparatus of claim 1, further including a third valve upstream of the second valve, the third valve including:
    a third plug to control the flow of the fluid; and
    a third spring coupled to a first end of the third plug.

3. The apparatus of claim 2, wherein the actuator is a first actuator, and the apparatus further including a second actuator, the second actuator coupled to the third valve.

4. The apparatus of claim 3, wherein the second actuator is controlled by a controller, the controller to signal the second actuator to actuate when an engine overspeed state is determined.

5. The apparatus of claim 1, wherein the first valve and the second valve are upstream of a combustor in an engine.

6. The apparatus of claim 5, further including a three-way valve downstream of the first valve and the second valve, the three-way valve upstream of the combustor.

7. The apparatus of claim 6, wherein the three-way valve is coupled to a vent stack.

8. The apparatus of claim 7, wherein the three-way valve is controlled by a controller, the controller to open a flow from the first valve to the combustor when the engine is in a run state.

9. The apparatus of claim 7, wherein the three-way valve is controlled by a controller, the controller to open a flow from the second valve to the vent stack when the engine is in at least one of a shut off state or an overspeed state.

10. A system to reduce fuel combustion, the system comprising:
    a controller to determine an operating state of an engine;
    a first valve of a fuel metering system connected to a fuel supply line, the first valve upstream of a combustor of the engine, the first valve controlled by the controller based on the operating state;
    a second valve of a purge system connected to the fuel supply line, the second valve upstream of the combustor, the second valve in parallel with the first valve, the second valve magnetically coupled to the first valve; and
    a three-way valve downstream of the first valve and the second valve, the three-way valve upstream of the combustor.

11. The system of claim 10, wherein a configuration of the first valve is changed by an actuator.

12. The system of claim 10, wherein the three-way valve is coupled to a vent stack.

13. The system of claim 12, wherein the three-way valve is controlled by the controller, the controller to open a flow from the first valve, close the three-way valve to the vent stack, and to open the three-way valve to the combustor when the engine is in a running state.

14. The system of claim 13, wherein the three-way valve is controlled by the controller, the controller to close a fuel flow from the first valve, close the three-way valve to the combustor, and open the three-way valve to the vent stack when the engine is in at least one of a shut off state or overspeed state.

* * * * *